(12) United States Patent
Mangaroo et al.

(10) Patent No.: US 8,071,878 B2
(45) Date of Patent: Dec. 6, 2011

(54) SEALING SYSTEM AND SEAL COMPONENT FOR A DISPLAY ASSEMBLY OF A PORTABLE DEVICE

(75) Inventors: Alan Mangaroo, Oakville (CA); Bo Xu, Mississauga (CA)

(73) Assignee: Psion Teklogix Inc., Mississauga, Ontario (CA)

( * ) Notice: Subject to any disclaimer, the term of this patent is extended or adjusted under 35 U.S.C. 154(b) by 755 days.

(21) Appl. No.: 12/181,854

(22) Filed: Jul. 29, 2008

(65) Prior Publication Data

US 2010/0025942 A1 Feb. 4, 2010

(51) Int. Cl.
*H01J 5/20* (2006.01)
(52) U.S. Cl. .................. 174/50.5; 174/50.54; 174/50.58
(58) Field of Classification Search .................. 174/50.5, 174/50.51, 50.54, 50.58, 50.61, 50.63, 50.64, 174/520; 361/730
See application file for complete search history.

(56) References Cited

U.S. PATENT DOCUMENTS

| | | | | |
|---|---|---|---|---|
| 5,786,548 | A * | 7/1998 | Fanucchi et al. | 174/50.54 |
| 6,721,651 | B1 * | 4/2004 | Minelli | 701/200 |
| 7,651,029 | B1 * | 1/2010 | Mangaroo et al. | 235/462.45 |
| 7,663,879 | B2 * | 2/2010 | Richardson et al. | 361/679.56 |
| 7,787,239 | B2 * | 8/2010 | Mangaroo et al. | 361/679.01 |
| 2004/0089570 | A1 * | 5/2004 | Chien et al. | 206/320 |
| 2009/0260844 | A1 * | 10/2009 | Tseng | 174/50.5 |

* cited by examiner

*Primary Examiner* — Dameon Levi
(74) *Attorney, Agent, or Firm* — Occhiuti Rohlicek & Tsao LLP

(57) ABSTRACT

A display assembly for a portable terminal inhibits the penetration of foreign matter from an exterior environment into the interior of the portable terminal. The display assembly includes a display for mounting in an open-faced compartment enclosed by a bottom/top cover plate. A resilient seal component of the display assembly is positioned between the display and the compartment, the seal component including a body including a base portion connected to a top portion by side portions for defining an interior channel for engaging the sides of the display, once received therein. A top portion of the seal component is adapted for overlapping a portion of the top surface of the display and the base portion for overlapping at least a portion of the bottom surface of the display.

29 Claims, 19 Drawing Sheets

SEALING SYSTEM AND SEAL COMPONENT FOR A DISPLAY ASSEMBLY OF A PORTABLE DEVICE

FIELD OF THE INVENTION

This invention relates to a seal component for a portable terminal.

BACKGROUND

Wireless communication has advanced significantly over the past few decades. Today, mobile terminals (such as mobile phones, pagers, personal digital assistants, scanners and similar devices) play an important role in society. People of all ages and walks of life use these mobile terminals to communicate, access the Internet, play games, store information, communicate with bar codes and RFID tags, and organize their calendars. People often rely on having easy access to their mobile terminals at all times.

As consumers increasingly rely on their mobile terminals, they desire to take their mobile terminals everywhere they go and have access to them at any time of day. As a result, today's mobile devices are frequently used in environments hostile to the mobile terminal's electronics. For example, a person who takes a cell phone, PDA, or similar device, to the beach risks harming the device by getting the device sandy or wet. Likewise, someone who works outdoors and is exposed to the elements may desire to have a mobile terminal that is water, dirt, and shock resistant. Accordingly, the sealing feature of a display of the mobile device and the device housing is important for the continued operational integrity of the device in the presence of hostile environments with undesirable foreign matter (e.g. water, other fluids, moisture, particulate matter, etc.).

Further, different assembly processes for the display into the housing of the device need approximately configured sealing components that are compatible with the assembly processes.

SUMMARY

It is an object of the present invention to provide a seal component and assembly for a portable terminal to obviate or mitigate at least some of the above-presented disadvantages.

The sealing feature of a display of the mobile device and the device housing is important for the continued operational integrity of the device in the presence of hostile environments with undesirable foreign matter (e.g. water, other fluids, moisture, particulate matter, etc.). Further, different assembly processes for the display into the housing of the device need approximately configured sealing components that are compatible with the assembly processes. Contrary to current sealing mechanisms there is provided a display assembly for a portable terminal for inhibiting the penetration of foreign matter from an exterior environment into the interior of the portable terminal. The display assembly includes a display for mounting in an open faced compartment enclosed by a bottom/top cover plate, the display having a bottom surface, a plurality of side surfaces, and a top surface for interaction with a user of the portable terminal. The compartment of the enclosure of the display assembly has an interior bottom/top surface and a plurality of interior side surfaces. A resilient seal component of the display assembly is positioned between the display and the compartment, the seal component including a body including a base portion connected to a top portion by a plurality of side portions for defining an interior channel for engaging the sides of the display, once received therein. A top portion of the seal component is adapted for overlapping a portion of the top surface of the display and the base portion for overlapping at least a portion of the bottom surface of the display. The body has the exterior surface for positioning adjacent to the interior surfaces of the compartment and the interior surface of the channel for positioning adjacent to the top surface and the bottom surface and the plurality of side surfaces of the display. The seal body has a first sealing rib positioned on either the exterior surface or the interior surface of the seal body, the first sealing rib being integral, for example, with the seal body and projecting from the respective exterior or interior surface. The first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

A first aspect provided is a resilient seal component for inhibiting a penetration of foreign matter from an exterior environment into an interior of a portable terminal, the portable terminal having a display for mounting in an open faced compartment enclosed by a top cover plate, the display having a bottom surface, a plurality of side surfaces, and a top surface for interaction with a user of the portable terminal, the compartment having an interior bottom surface and a plurality of interior side surfaces, the seal component comprising: a body including a base portion connected to a top portion by a plurality of side portions for defining an interior channel adapted for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and a first sealing rib positioned on either the exterior surface or the interior surface of the seal body, the first sealing rib integral with the seal body and projecting from the respective exterior or interior surface; wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

A second aspect provided is a resilient seal component for inhibiting a penetration of foreign matter from an exterior environment into an interior of a portable terminal, the portable terminal having a display for mounting in an open faced compartment enclosed by a bottom cover plate, the display having a bottom surface, a plurality of side surfaces, and a top surface for interaction with a user of the portable terminal, the compartment having an interior top surface and a plurality of interior side surfaces, the seal component comprising: a body including a base portion connected to a top portion by a plurality of side portions for defining an interior channel adapted for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and a first sealing rib positioned on either the exterior surface or the interior surface of the seal body, the first sealing rib integral with the seal body and projecting from the respective exterior or interior surface; wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

A third aspect provided is a display assembly for a portable terminal for inhibiting a penetration of foreign matter from an exterior environment into an interior of a portable terminal; the display assembly including: a display for mounting in an open faced compartment enclosed by a top cover plate, the display having a bottom surface, a plurality of side surfaces, and a top surface for interaction with a user of the portable terminal; the compartment of an enclosure of the portable terminal having an interior bottom surface and a plurality of interior side surfaces; a resilient seal component for positioning between the display and the compartment, the seal component including a body including a base portion connected to a top portion by a plurality of side portions for defining an interior channel for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and a first sealing rib positioned on either the exterior surface or the interior surface of the seal body, the first sealing rib integral with the seal body and projecting from the respective exterior or interior surface; wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

A fourth aspect provided is a display assembly for a portable terminal for inhibiting a penetration of foreign matter from an exterior environment into an interior of a portable terminal; the display assembly including: a display for mounting in an open faced compartment enclosed by a bottom cover plate, the display having a bottom surface, a plurality of side surfaces, and a top surface for interaction with a user of the portable terminal; the compartment of an enclosure of the portable terminal having an interior top surface and a plurality of interior side surfaces; a resilient seal component for positioning between the display and the compartment, the seal component including a body including a base portion connected to a top portion by a plurality of side portions for defining an interior channel for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and a first sealing rib positioned on either the exterior surface or the interior surface of the seal body, the first sealing rib integral with the seal body and projecting from the respective exterior or interior surface; wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Portable Terminal 10

Figure 1:
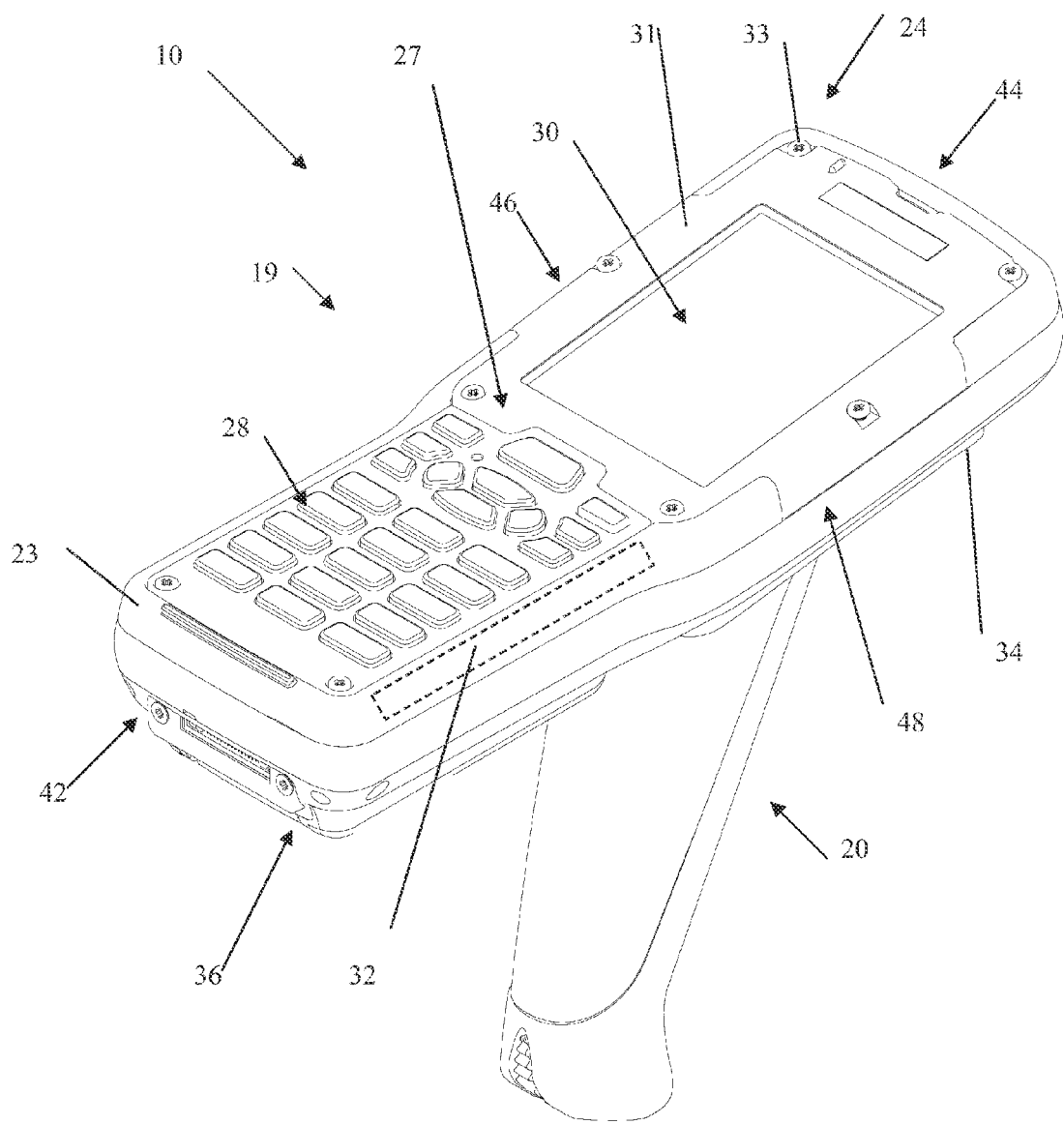
FIG. 1 is a perspective top view of components of a portable terminal for interaction with a logistics environment.
Figure 2:
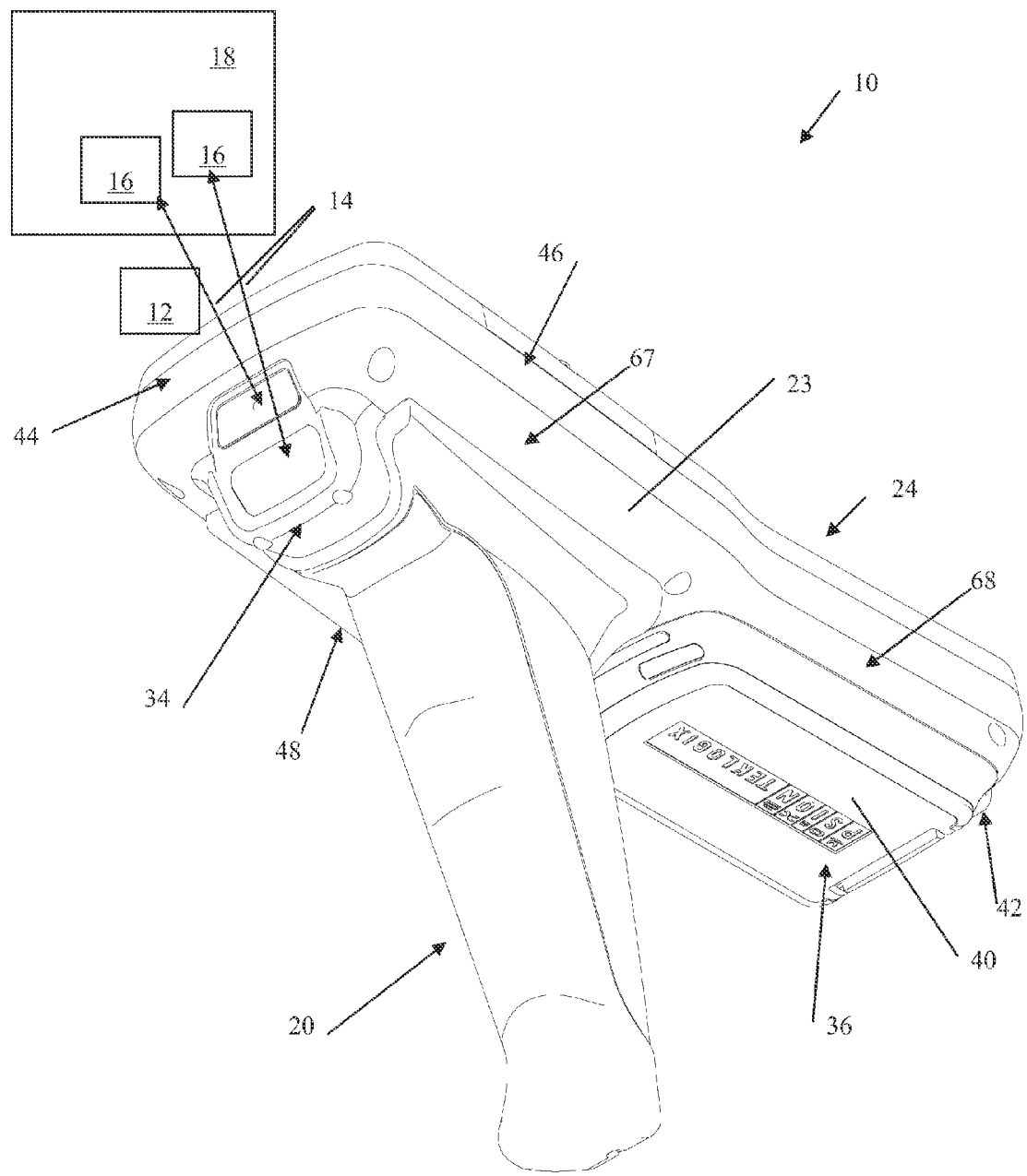
FIG. 2 is a perspective bottom view of the portable terminal of FIG. 1.

Referring to FIGS. 1 and 2, shown is a portable terminal 10 for providing imaging and/or scanning features in data capture/communications 12 and asset tracking/management, for example in wireless communication 14 with tracking/information objects 16 (e.g. barcode labels and/or RFID tags) present in one or more logistics environments 18 (e.g. industrial, retail, supply chain), for example. It is recognised that the portable terminal 10 can also be a telecommunications device, such as but not limited to: a PDA; a cell phone; a pager; etc., as any device that has a display 30 coupled to the housing of the device.

It is recognised that the objects 16 can be attached to products that are being transported from one location to another in the logistics environment 18. Examples of these environments 18 can include environments such as but not limited to: front store retail and/or warehousing for mobile stock checking, price checking, and merchandising; and utilities for meter reading, surveying, parking enforcement, and asset tracking.

The portable terminal 10 has an optional handle 20, connected via a release securable connection, to an enclosure 23 of a handheld computer 24. It is also recognised that the handle 20 may be permanently or otherwise fixedly attached to the enclosure 23 by fastening means such as but not limited to: protrusions engaged in slots, latch mechanisms, fasteners (e.g. screws), adhesives or other bonding agents, etc. Further, the handle 20 may be an integral component of at least a portion of the enclosure 23 (e.g. molded as part of the enclosure 23).

The computer 24 has a number of components 19 including a user interface 26 located on a front surface 27, including a keyboard 28 and a display 30 (e.g. touch screen), one or more onboard processors 32 (e.g. shown by ghosted lines as inside of the enclosure 23), and a scanner/radio communications module 34 (e.g. laser, WLAN with VoIP and Bluetooth, imager, RFID scanner, etc.—inside of the enclosure 23), for example located on a back surface 67 of the terminal 10, for facilitating the wireless communication 14. The portable terminal 10 also has an onboard power source 36 located adjacent to an adjacent back surface 68 of the back surface 67 for helping to satisfy power requirements of the onboard processor(s) 32, the user interface 26, and optionally the communication module 34. Further, the enclosure 23 has a proximal end 42, a distal end 44, and a first side 46 and a second side 48 extending between the ends 42, 44.

The power source 36 (e.g. battery) is contained within the enclosure 23 by a cover 40 that is coupled to the enclosure 23 on the back surface 67 (e.g. located near the adjacent back surface 68), as either removable or as an integral part of the enclosure 23. Further, the display 30 is coupled to the enclosure 23 by a cover plate 31 connected (e.g. releasable) via a plurality of fasteners 33 (e.g. screws, snaps, rivets, adhesive or other fastening means as apparent to one skilled in the art). The display 30 is situated between a seal component 50 (e.g. a gasket) and a compartment 56 of the enclosure 23 (see FIG. 4), such that the ingress of foreign matter (e.g. water, moisture, particulate matter, etc.) around the display 30 and into the compartment 56 (e.g. onto a base surface 54 of the compartment 56) is inhibited by the seal component 50. Further, the display 30 (e.g. configured as a touch screen) has a top surface 80 (e.g. for providing a display of logistical information related to the logistics environment 18), a plurality of side surfaces 82, and a bottom surface 84 (see FIG. 4), such that the side surfaces 82 connect the top surface 80 with the bottom surface 84 to define a component volume of the display 30.

It is recognised that in the description, the terms "housing" and "enclosure" can be used interchangeably.

Seal Component 50

Figure 4:
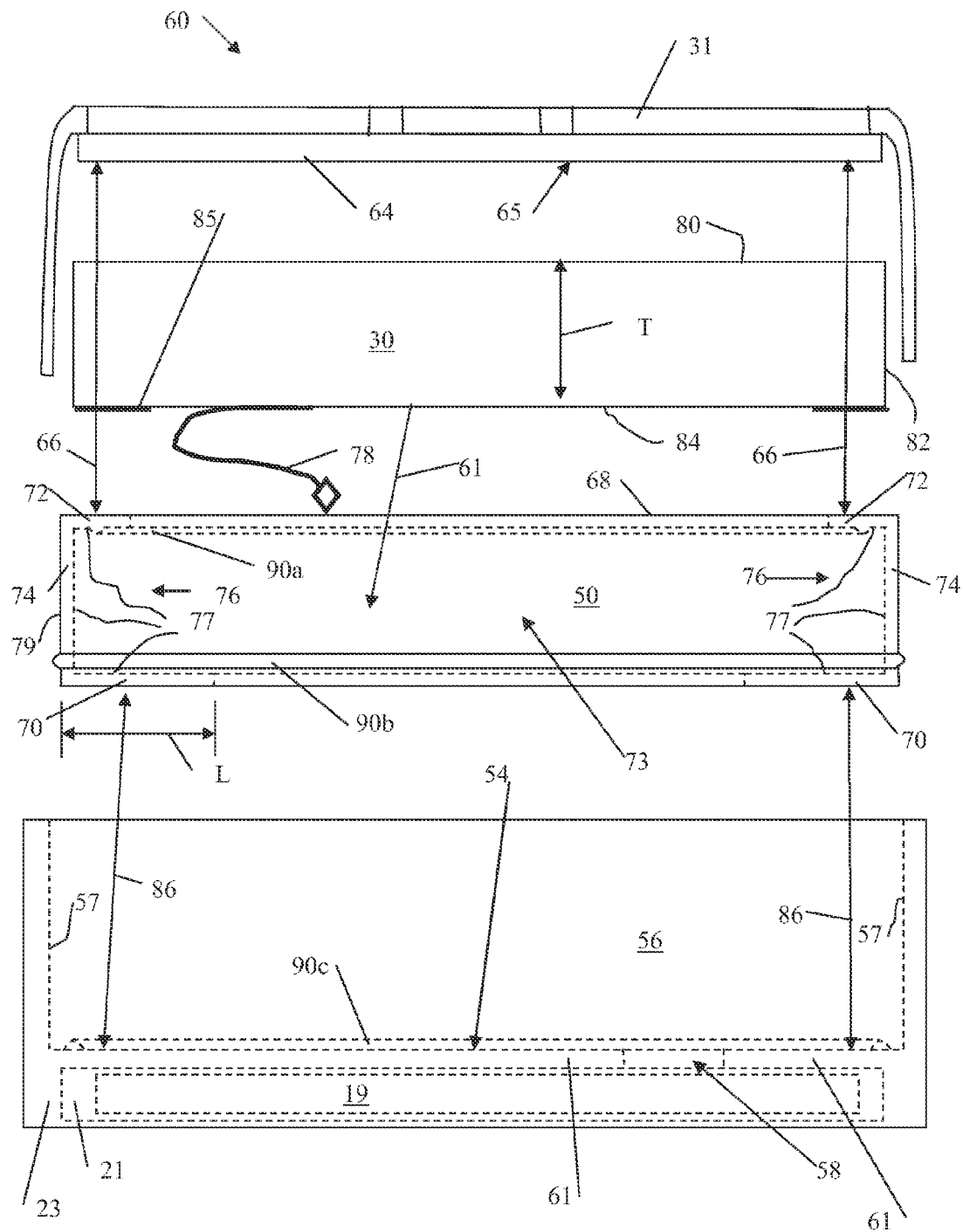
FIG. 4 shows an exploded/unassembled side view of the display assembly of FIG. 3.
Figure 7:
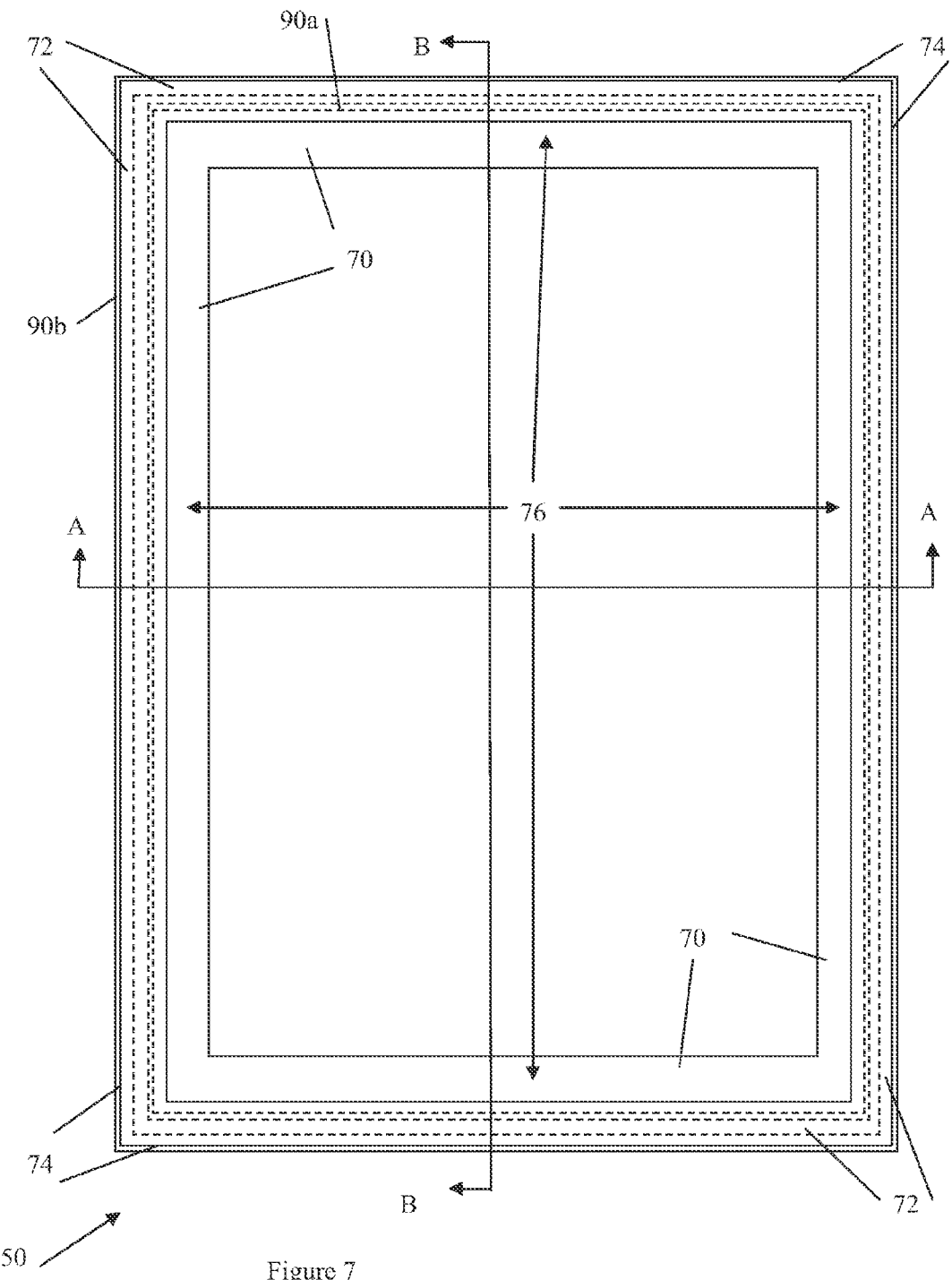
FIG. 7 is a top view of a seal component of the display assembly of FIG. 3.
Figure 10A:
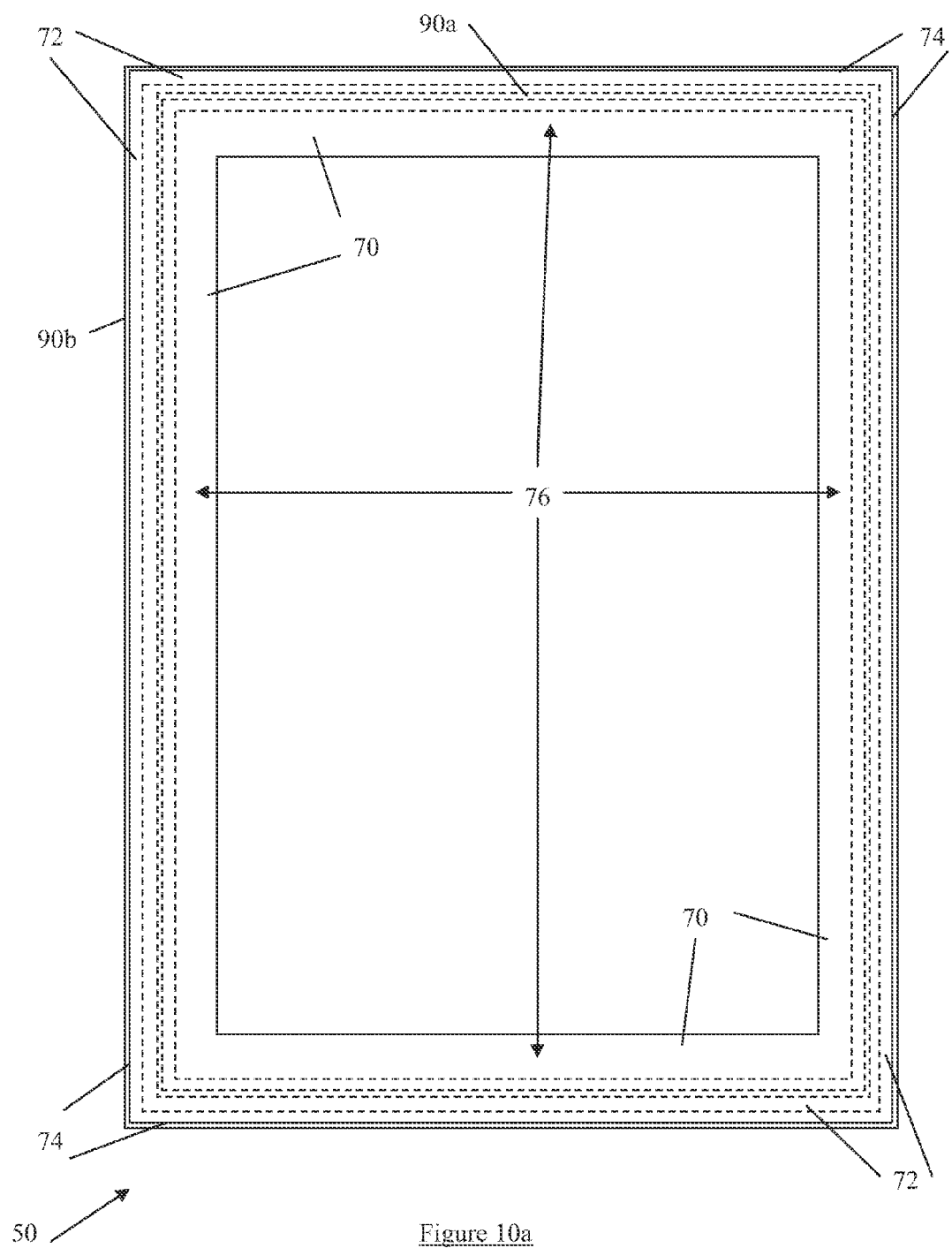
FIG. 10*a* is bottom view of the seal component of the display assembly of FIG. 3.
Figure 11:
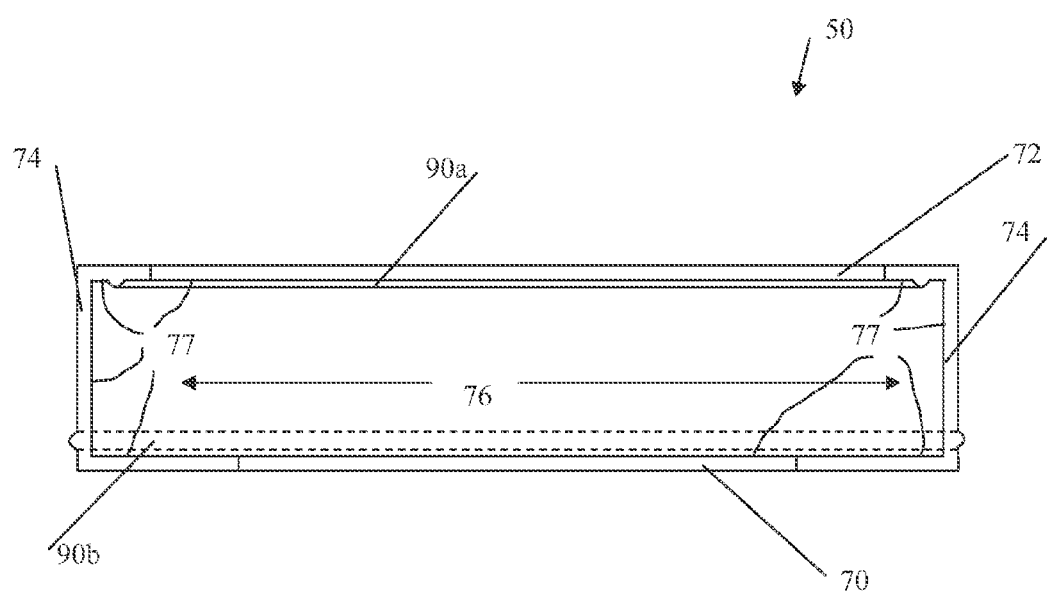
FIG. 11 shows a cross-sectional view A-A of the seal component of FIG. 7.
Figure 12:
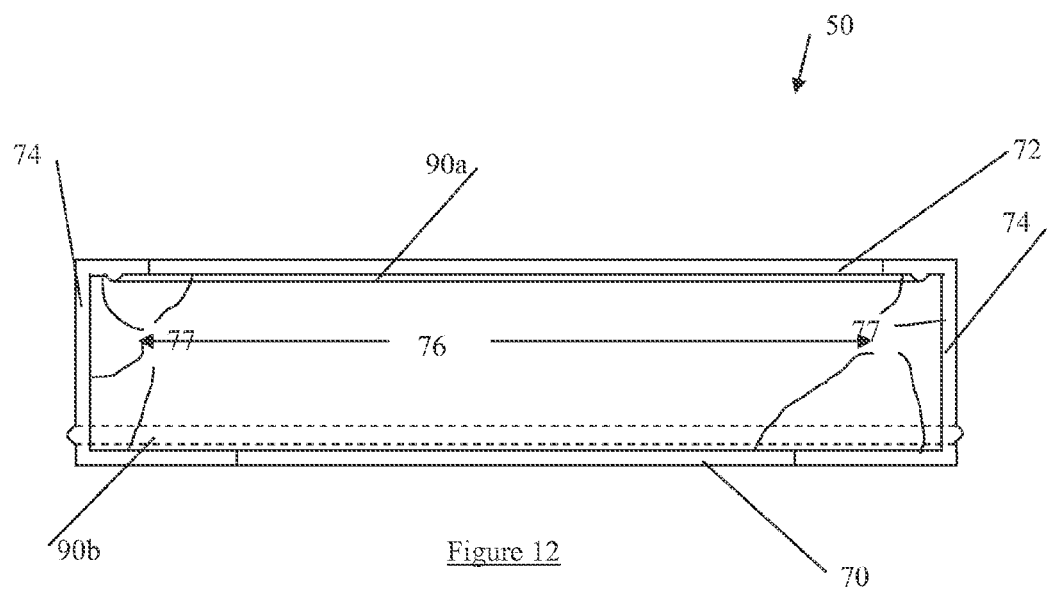
FIG. 12 shows a cross-sectional view B-B of the seal component of FIG. 7.

Referring to FIG. 7 showing a top view of the seal component 50 and FIG. 10a showing a bottom view of the seal component 50, the seal component 50 has a base portion 70 connected to a top portion 72 by a plurality of side portions 74, thereby defining a channel 76 (see FIG. 11) into which the display 30 is inserted/received 61 (see FIG. 4). The channel 76 provides an interior peripheral surface 77 (e.g. generally U shaped) of the seal component 50 for positioning against (and/or adjacent to) at least a portion of the top surface 80, the side surfaces 82 and at least a portion of the bottom surface 84 of the display 30. The top portion 72 and the base portion 70 extend from the side portions 74 and are in a spaced apart relationship with respect to the attachment locations of the portions 70,72 to the side portions 74, in order to accommodate a thickness T of the display 30 inserted/received 61 there between (see FIG. 4).

Figure 10B:
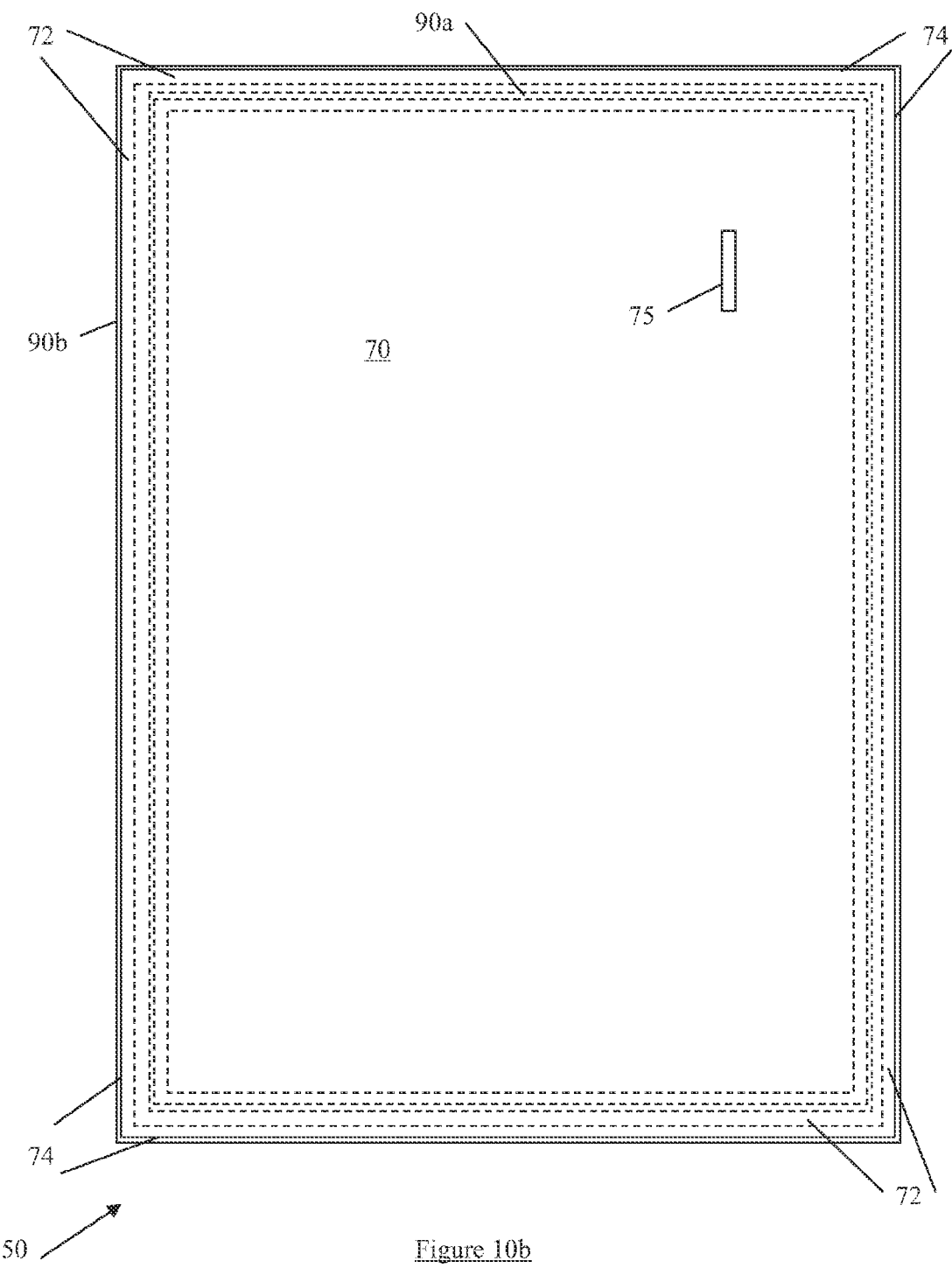
FIG. 10*b* is an alternative embodiment of the seal component of FIG. 10*a;*

It is recognised that the base portion 70 can be as shown in FIG. 10a for overlapping a portion of the bottom surface 84 (see FIG. 4) of the display 30 or can be as shown in FIG. 10b for overlapping the entire bottom surface 84. Further, one or more apertures (e.g. holes) 75 can be positioned in the base portion 70 for accommodating a connection/coupling 78 located on the bottom surface 84 (e.g. for power and/or information), see FIG. 4, between the display 30 and other components 19 (e.g. power source 36, processor 32) of the computer 24. For example, the connector 78 is a flex cable having a length for extending between the display 30 and one or more of the components 19 of the computer 24 and a width for providing one or more independent connections (e.g. display signals, power, etc.) between the one or more of the components 19 and the display 30.

Referring again to FIG. 4, a plurality of sealing ribs 90 (e.g. sealing ribs 90a, 90b, and/or 90c) are included in a display assembly 60, further described below, in order to inhibit the ingress of contaminant matter (e.g. water, other fluids, particulate matter, etc.) from the logistics environment 18 (see FIG. 1) into and between the display 30 and the seal component 50 (e.g. coming in contact with the surface 77 of the base portion 70 and/or the side portions 74) and/or into and between the seal component 50 and the compartment 56 (e.g. coming in contact with the base surface 54 of the compartment 56). For example, the sealing rib 90a is located around the peripheral interior surface 77 of the top portion 72 of the seal component 50. For example, the sealing rib 90b is located around a peripheral exterior surface 79 of the side portions 74 of the seal component 50. For example, the sealing rib 90c is located around the periphery of the bottom surface 54 of the compartment 56. In any event, it is preferable that at least on of the sealing ribs 90a,b,c are integral to the material of the seal component 50.

The seal component 50 is made of a resilient material for facilitating a compression of the sealing component between the cover plate 31 and the top surface 80 of the display 30, between the side surface 82 of the display 30 and a sidewall 57 of the compartment 56, and/or between the bottom surface 84 of the display 30 and the bottom surface 54 of the compartment 56. The material of the seal component 50 is made of resiliently flexible material, such as but not limited to: rubber; a rubber derivative; an elastomeric material; and other suitable polymers as would be apparent to one skilled in the art, for facilitating the seal for inhibiting the penetration of contaminant material from the logistics environment 18 into the interior of the enclosure 23 of the portable terminal 10.

Further, referring to FIG. 4, it is recognised that the extent of the base portion(s) 70 extending inwardly from the side portion(s) 74 is of a length L (providing an overlap surface of a corresponding overlap area) sufficient to provide an appropriate friction force between the surface 77 of the base portion(s) 70 and the bottom surface 84 of the display 30, such that this friction force between the two surfaces inhibits at least a partial release of the display 30 from the channel 76 as the assembled display 30 and seal 50 (as an assembled unit 100) are inserted 86 into the compartment 56. Accordingly, the overlap area between the base portion 70 and the bottom surface 84 of the display 30 is of a sufficient size for facilitating the frictional forces between the interior surface 77 of the base portion 70 and the bottom surface 84 of the display 30 to inhibit at least the partial release of the display 30 from the channel 76 when the assembled display 30 and seal body 88 as a unit are inserted into the compartment 56.

Figure 13:
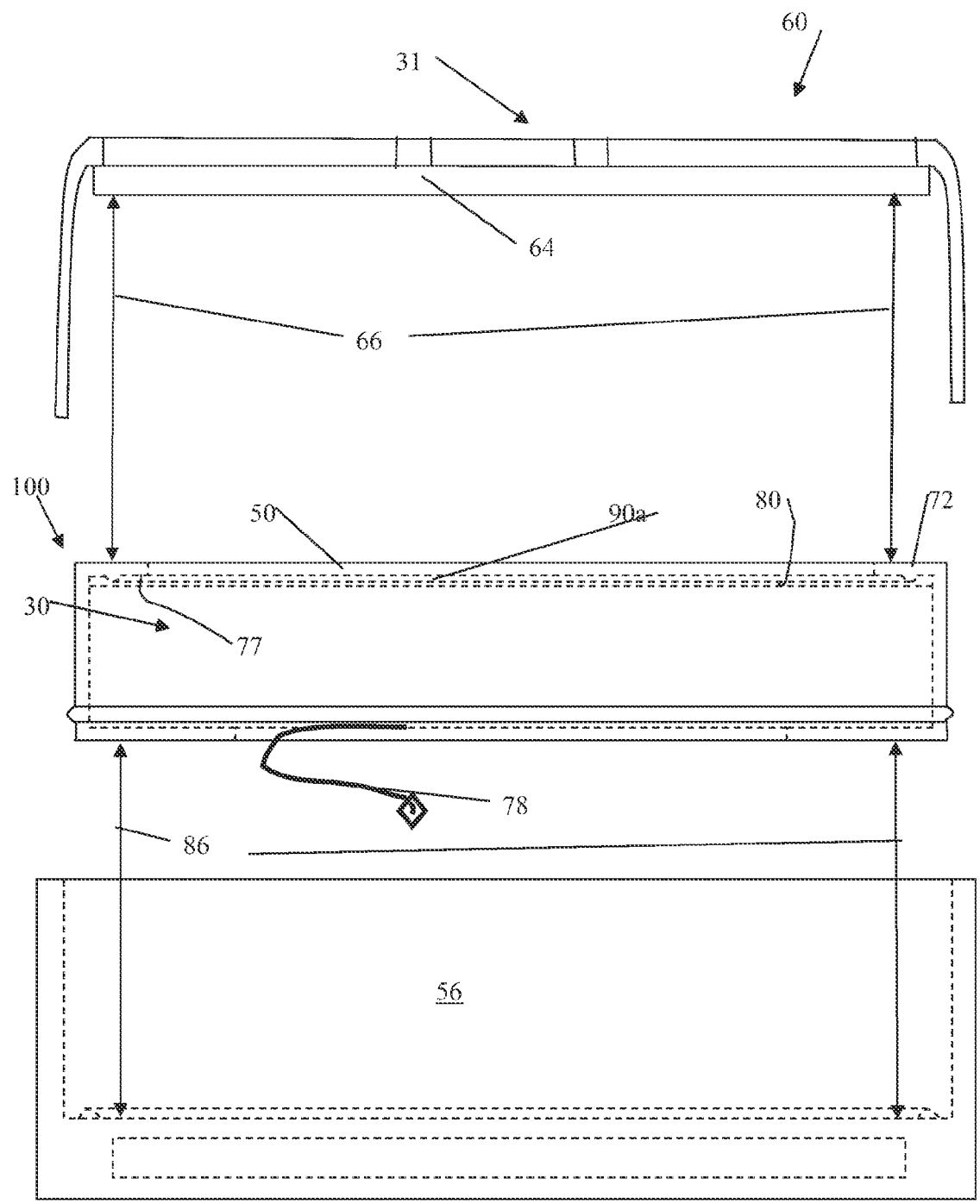
FIG. 13 is a side view of a partially assembled display assembly of FIG. 3.

Any appreciable release of the display 30 from the channel 76 (as the assembled display 30 and seal component 50 are being inserted as an assembled unit 100—see FIG. 13—into the compartment 56) can cause a misalignment of the sealing rib 90a between the top surface 80 of the display and the interior surface 77 of the top portion(s) 72 of the seal component 50, thus causing a potential failure of the seal (for inhibiting the penetration of foreign matter) between the display 30 and the seal component 50. It is also recognised that the bottom surface 84 of the display can optionally have a coating 85 (or other intermediate layer applied/adhered thereto) on all or a portion of the bottom surface 84 (e.g. in the vicinity of the overlap between the base portion 70 and the bottom surface 84), for enhancing the friction force between the interior surface 77 of the bottom portion 70 with the display 30. It is recognised that the partial release of the display 30 from the channel 76 may cause a misalignment of the first sealing rib 90a,b,c between the top portion 72 and the top surface 80 of the display 30.

Cover Plate 31

Figure 3:
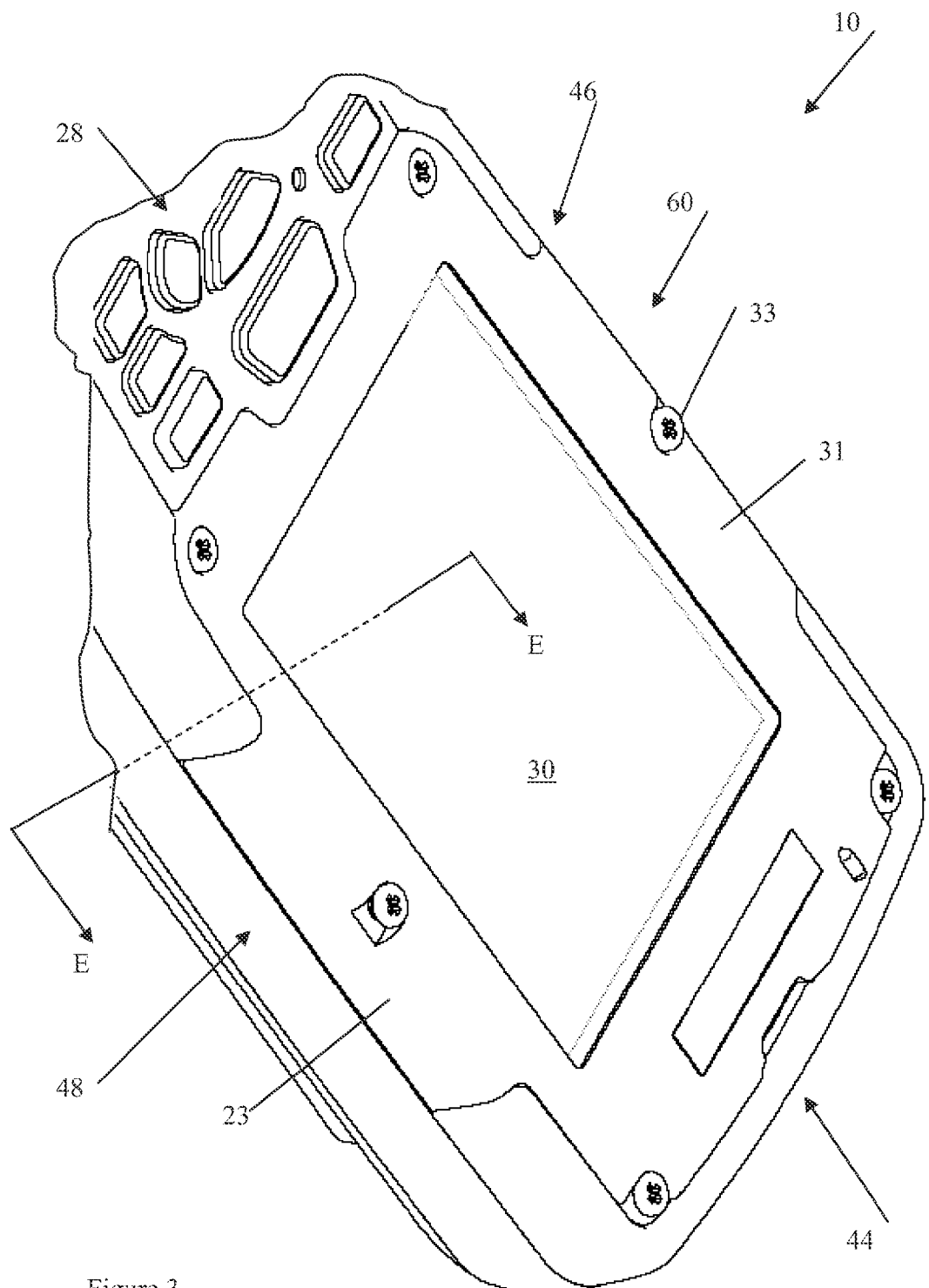
FIG. 3 is a perspective top view of a display assembly of a display of the terminal of FIG. 1.
Figure 5:
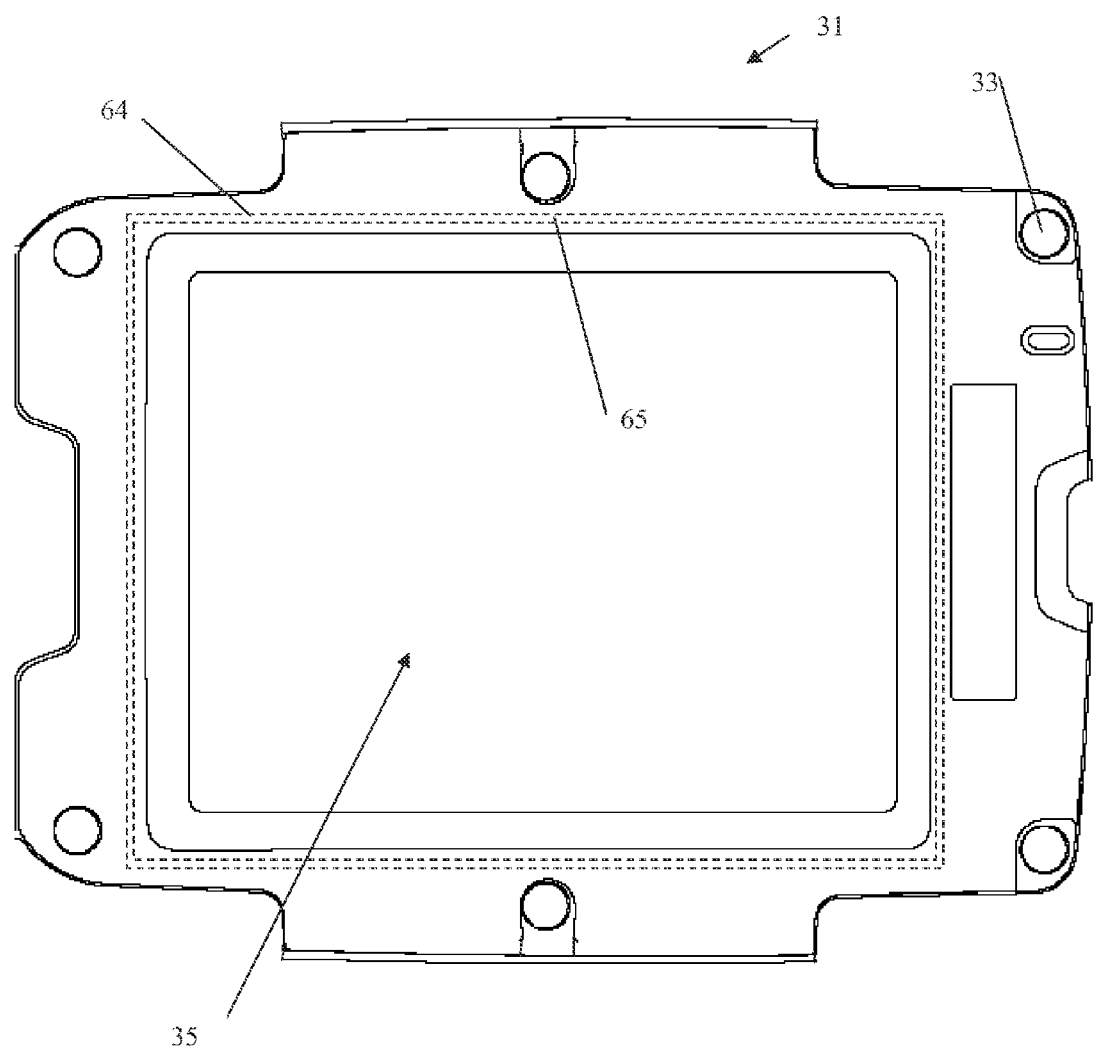
FIG. 5 a top view of a cover plate of the display assembly of FIG. 3.
Figure 6:
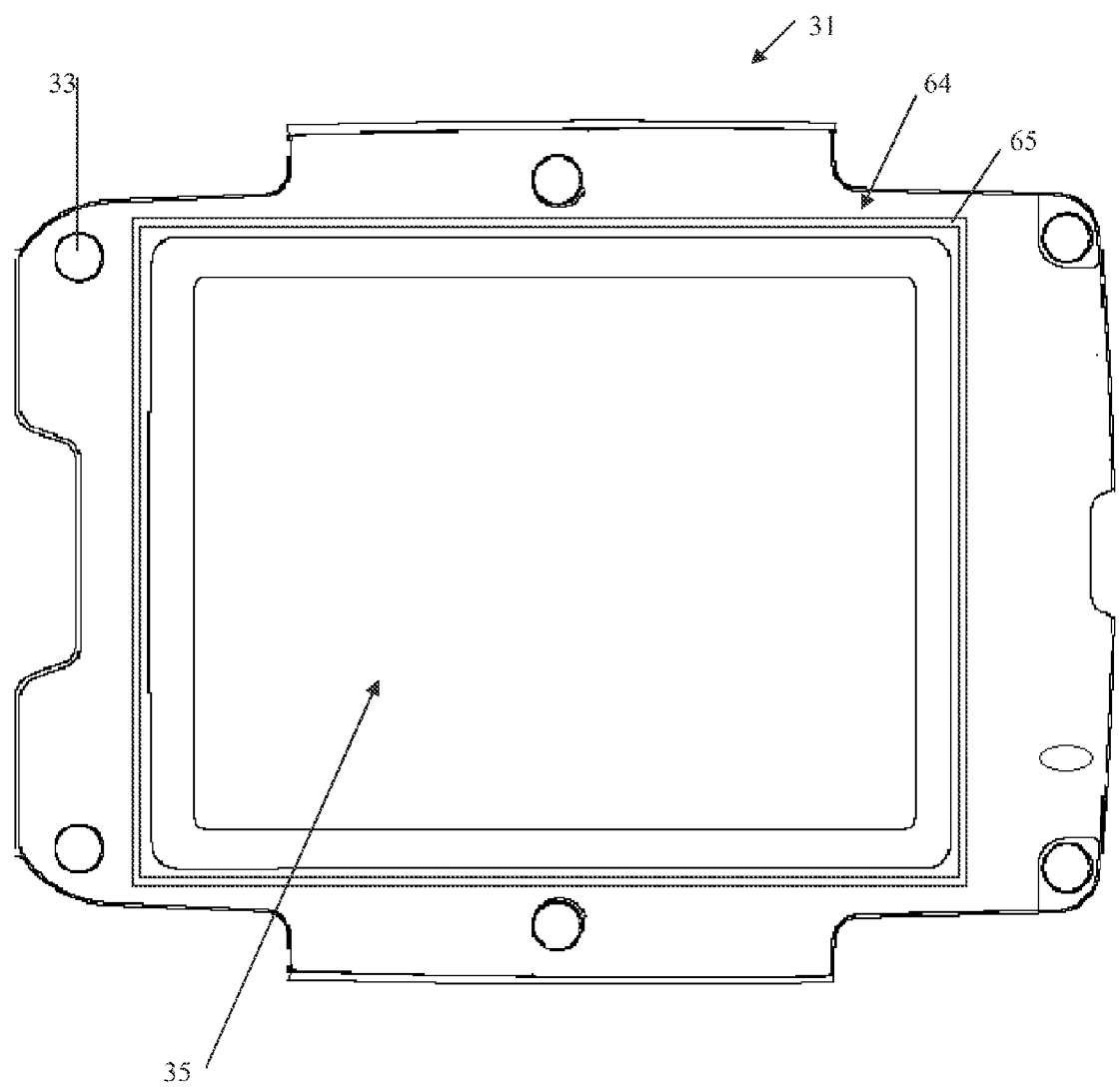
FIG. 6 is a bottom view of a cover plate of the display assembly of FIG. 3.

Referring to FIGS. 5 and 6, shown is the cover plate 31 for connecting (e.g. releasable) via a plurality of fasteners 33 (e.g. screws, snaps, rivets, adhesive or other fastening means as apparent to one skilled in the art) to the enclosure 23 (see FIG. 3). The cover plate 31 has a surface 65 of a rib 64 (e.g. for optional sealing between the cover plate 31 and the seal component 50) for interacting/pressing 66 (see FIG. 4) with an adjacent surface 68 of the seal component 50, thereby engaging the sealing ribs 90a,b,c with their adjacent surfaces so as to inhibit the penetration of foreign matter. The cover plate 31 is configured for having an aperture 35 for accommodating interaction (e.g. touch screen functionality) between the user of the portable terminal 10 and the top surface 80 (see FIG. 4) of the display 30. As further described below, the cover plate 31 fastens to the front surface 27 of the portable terminal 10 as a cover to the compartment 56, thus providing for installation and/or servicing of the display 30 from the front surface 27.

Further, it is recognised that in the display assembly 60 (or 61) the top cover plate 31 when coupled to the enclosure 23 of the portable terminal 10 is adapted to force (e.g. via the rib 64) the top portion 72 onto the top surface 80 of the display 30 and to force the bottom surface 84 of the display 30 onto the bottom surface 54 of the compartment 56, thereby providing the sealable engagement of the sealing rib 90a between the top portion 72 and the top surface 80 of the display 30 and to providing the sealable engagement of the sealing rib 90c between the base portion 70 and the bottom surface 54 of the compartment 56.

Display Assembly 60
Unassembled

Referring to FIG. 4, shown is an unassembled display assembly 60 consisting of a cover plate 31 configured for fastening 33 to an enclosure 23, thereby providing a cover for the compartment 56 of the enclosure 23. The cover plate 31 has a surface 65 of the rib 64 for interacting/pressing 66 with an adjacent surface 68 of the seal component 50. The display 30 is dimensioned so as be insertable 61 (or otherwise receivable) in an interior 73 of the seal component 50, such that at least portions of the top 80, sides 82 and bottom surface 84 of the display 30 come into contact with the interior peripheral surface 77 of the seal 50, such that the sealing rib 90a is positioned between the top portion 70 of the seal component 50 and the top surface 80 of the display 30.

The display assembly 60 also has a compartment 56 dimensioned for receiving 85 the seal component 50 in an interior 56 (e.g. open interior) of the compartment 56. The compartment 56 has side surfaces 57 and the bottom surface 54, such that the side surfaces 57 come into contact with the exterior peripheral side surface 79 of the seal component 50 and the bottom surface 54 comes into contact with the exterior surface of the bottom portion 72. As shown in FIG. 4, the bottom surface 54 of the compartment 56 can have an aperture 58 for accommodating passage of the connector/coupling 78 from the display 30 to one or more other components 19 of the computer 23 located in an interior 21 of the enclosure 23 separated by one or more internal structures (e.g. walls) 61 from the interior 56 of the compartment 56. Further, it is recognised that the sealing rib 90c is positioned for contact between the bottom surface (e.g. exterior surface) of the bottom portion 72 of the seal component 50 and the bottom surface 54 of the compartment 56.

Intermediate Assembled Unit 100

Referring to FIG. 13, shown is an intermediate view of the display assembly 60 (of FIG. 4) having the display 30 and the seal component 50 as an assembled unit 100 (e.g. the display 30 is already inserted into the channel 76 of the seal component 50), for example prior to the interaction/pressing 66 discussed above of the cover plate 31 on top of the seal component 50, as well as prior to the assembled unit 100 being inserted 86 into the compartment 56. It is recognised that the sealing rib 90a is interposed around a periphery of the top surface 80 of the display 30, between the interior surface 77 of the top portion 72 and the top surface 80 of the display 30. The sealing rib 90a is positioned at a selected location between top surface 80 of the display 30 and the interior surface 77 of the top portion 72, such that the pressing 66 of the rib 64 against the top portion 72 will force the sealing rib 90a into contact around the periphery of the top surface 80 of the display 30.

Intermediate Assembly 102

Figure 14:
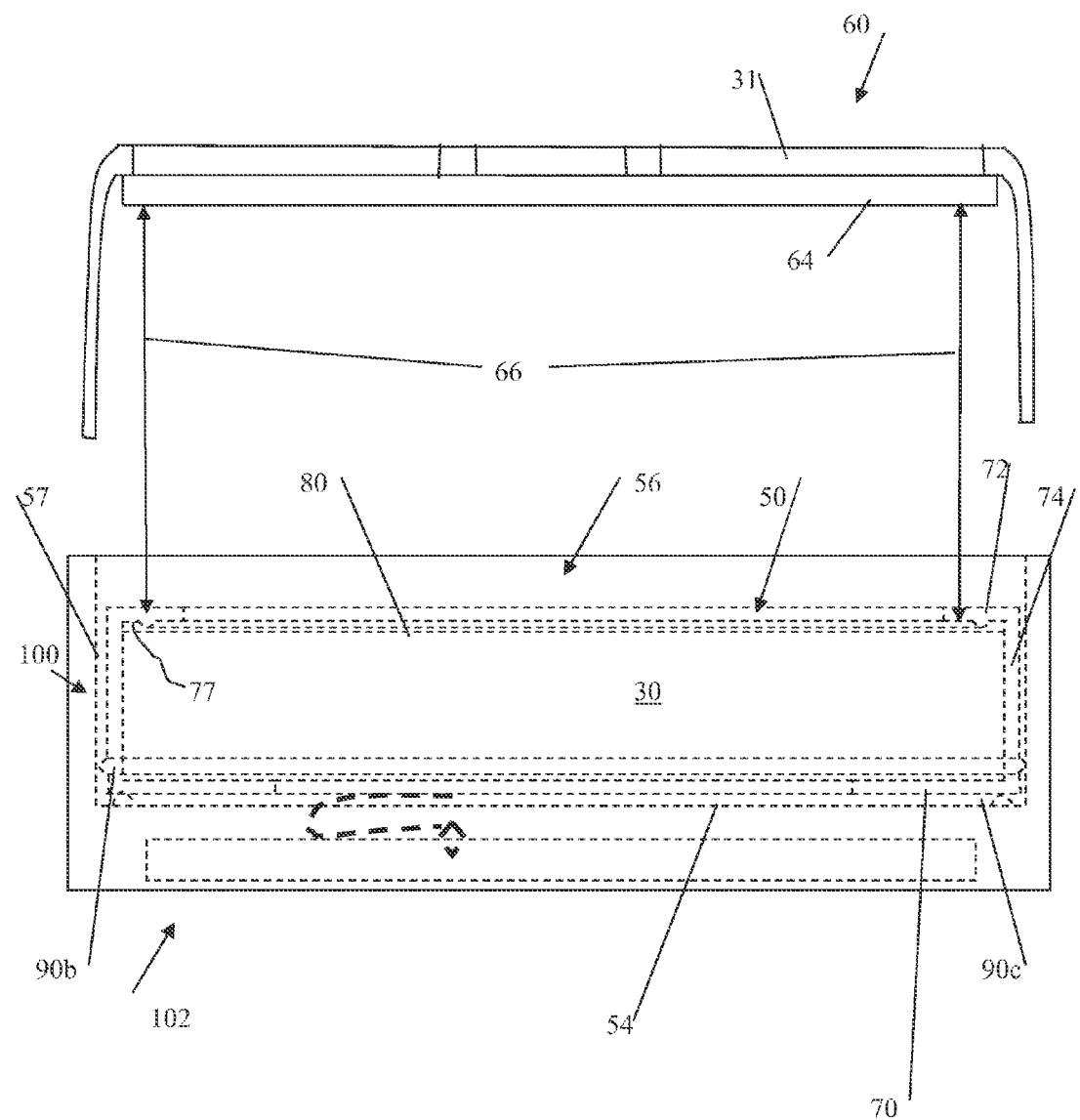
FIG. 14 is a side view of a further partially assembled display assembly of FIG. 3.

Referring to FIG. 14, shown is an intermediate assembly 102 of the assembled unit 100 of the display assembly 60 after insertion 86 (see FIG. 13) into the compartment 56. Accordingly, the sealing rib 90b is positioned between the peripheral surface of the sides 57 of the compartment 56 and the periphery of the exterior surface of the side portions 74 of the seal component 50, in order to inhibit the penetration of foreign matter between the side portion 74 and the side surface 57 to impinge on the bottom surface 54 of the compartment 56. It is recognised that the sealing rib 90b can be an optional component of the display assembly 60, as desired. Further, it is recognised that the positioning of the sealing rib 90a between the top surface 80 of the display 30 and the interior surface 77 of the top portion 72 of the seal component 50 is maintained (due to the friction force between the base portion 70 and the bottom surface 84 of the display 30) during insertion 86 (see FIG. 13) of the assembled unit 100 into the compartment 56.

Further, the sealing rib 90c is positioned between the bottom surface 54 of the compartment 56 and the exterior (e.g. bottom surface) of the base portion 70, thus facilitating a seal there between to inhibit the penetration of foreign matter between the base portion 70 and the bottom surface 54 of the compartment 56.

Final Assembly 60

Figure 15:
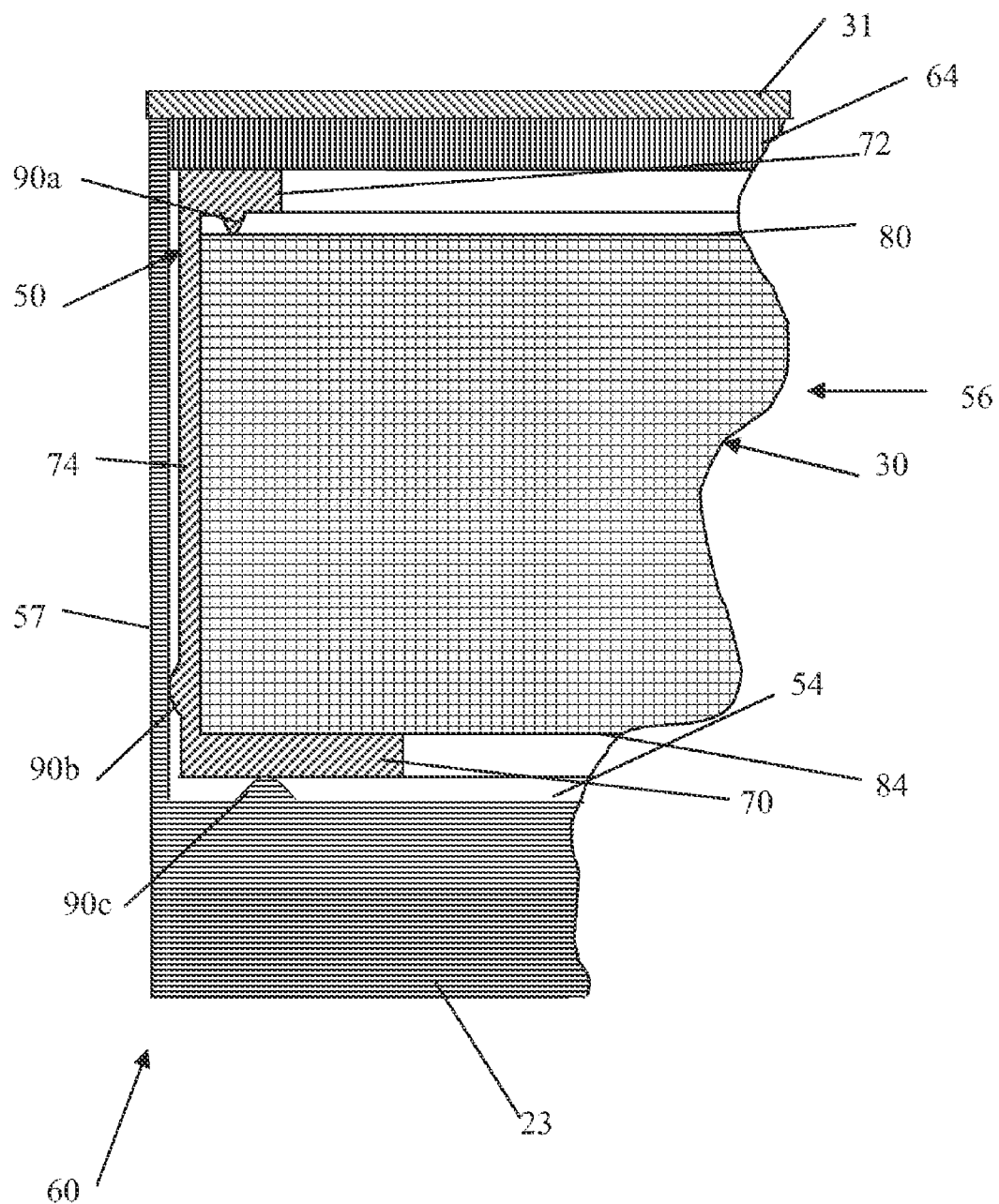
FIG. 15 shows a cross-sectional view E-E front view of the assembled display assembly of FIG. 3.

Referring to FIG. 15, shown is the assembled display assembly 60, such that the surface 65 of the first rib 64 (e.g. of the cover plate 31) interacts/presses with the adjacent top portion 72 of the seal component 50, thereby placing the sealing rib 90*a* into continuous contact around both a periphery of the top surface 80 of the display 30 and an interior surface 77 of the top portion 72 of the seal component 50, thus inhibiting the penetration of foreign matter between the top portion 72 and the seal component 50. It is recognised that the pressure exerted by the rib 64 on the seal component 50 also causes the bottom surface 84 of the display 30 to press against the base portion 70 of the seal component 50, thus placing the sealing rib 90*c* into continuous contact around both a periphery of the bottom surface 84 of the display 30 and the interior surface 77 of the base portion 70 of the seal component 50, thus inhibiting the penetration of foreign matter between the seal component 50 and the bottom surface 54 of the compartment 56.

Further, it is recognised that the optional sealing rib 90*b* is positioned in contact between the interior surface of the sides 57 of the compartment 56 and the exterior surface of the side portion 74 of the seal component 50, thus inhibiting the penetration of foreign matter between the sides 57 of the compartment 56 and the exterior surface of the side portion 74 and onto the bottom surface 54 of the compartment 56. The sealing rib 90*b* is positioned so as to facilitate the continuous contact of the sealing rib 90*b* around a periphery of the side portions 74 of the seal component 50 and the interior surface of the sides 57 of the compartment 56.

Referring again to FIG. 15, it is noted that the sealing ribs 90*a* and 90*b*, for example, are integral with the resilient material of the seal component 50, thus facilitating the compression of the resilient material of the sealing ribs 90*a,b* between the seal component 50 and the display 30 and between the seal component 50 and the sides 57 of the compartment 56. The sealing rib 90*c* is provided as integral with the material (e.g. rigid) of the compartment 56, thus providing for a compression of the rigid sealing rib 90*c* material into the resilient material of the bottom surface of the base portion 70 of the seal component 50. Further, it is recognised that the sealing rib 64 can be integral with the rigid material of the cover plate 31, thus providing for compression of the rigid rib 64 material into the resilient material of the top/exterior surface of the top portion 72 of the seal component 50.

Figure 16:
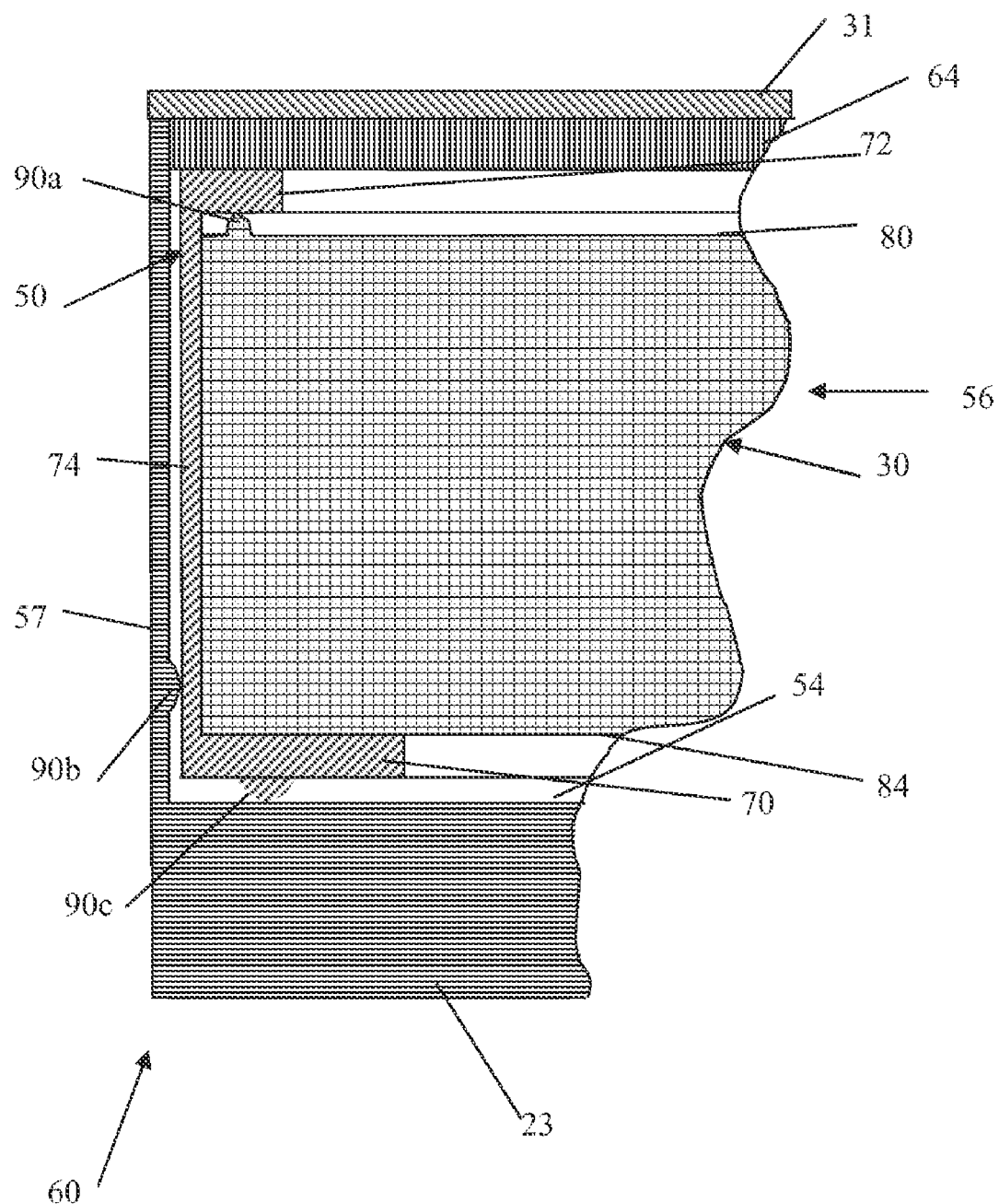
FIG. 16 is an alternative embodiment of the assembled display assembly of FIG. 15.

Referring to FIG. 16, shown is an alternative embodiment of the display assembly 60. It is noted that the sealing rib 90*a* for example, is integral with the rigid material of the display 30 (or can be provided as an adhered resilient sealing rib 90*a* on the top surface 80 of the rigid display 30), thus facilitating the compression of the resilient material of the sealing rib 90*a* into the resilient material of the top portion 72 of the seal component 50. The sealing rib 90*b*, for example, can be provided as integral with the rigid material of the compartment 56 (e.g. formed on the sides 57 of the compartment 56), thus facilitating the compression of the rigid material of the sealing ribs 90 into the resilient material of the side portions 74 of the seal component 50. Further, the sealing rib 90*c* is provided, for example, as integral with the material (e.g. resilient) of the base portion 70 of the seal component 50, thus providing for a compression of the resilient sealing rib 90*c* material of the base portion 70 by the rigid material of the bottom surface 54 of the compartment 56. Further, it is recognised that the sealing rib 64 is integral with the rigid material of the cover plate 31, thus providing for compression of the rigid rib 64 material into the resilient material of the top/exterior surface of the top portion 72 of the seal component 50.

It is also recognised, in view of the embodiments shown in the FIGS. 15 and 16 for the display assembly 60, it is recognised that the sealing rib 90*a* can be: integral with the resilient material of the seal component 50; integral with the rigid material of the display 30; or applied as a resilient or rigid layer to the top surface 80 of the display 30. Further, it is recognised that the optional sealing rib 90*b* can be: integral with the resilient material of the seal component 50; or integral with the rigid material of the sides 57 of the compartment 56, for example. Further, it is recognised that the sealing rib 90*c* can be: integral with the resilient material of the seal component 50; applied as a resilient or rigid layer to the bottom surface 54 of the compartment 56; or integral with the rigid material of the bottom surface 54 of the compartment 56, for example.

Figure 8:
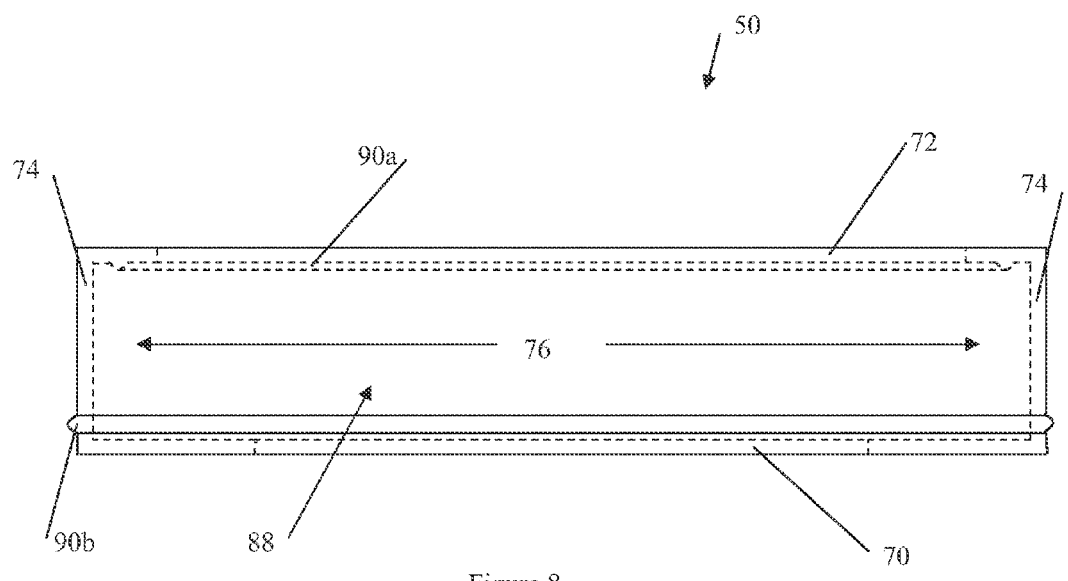
FIG. 8 is a side view of the seal component of FIG. 7 viewed from a proximal end of the portable terminal.
Figure 9:
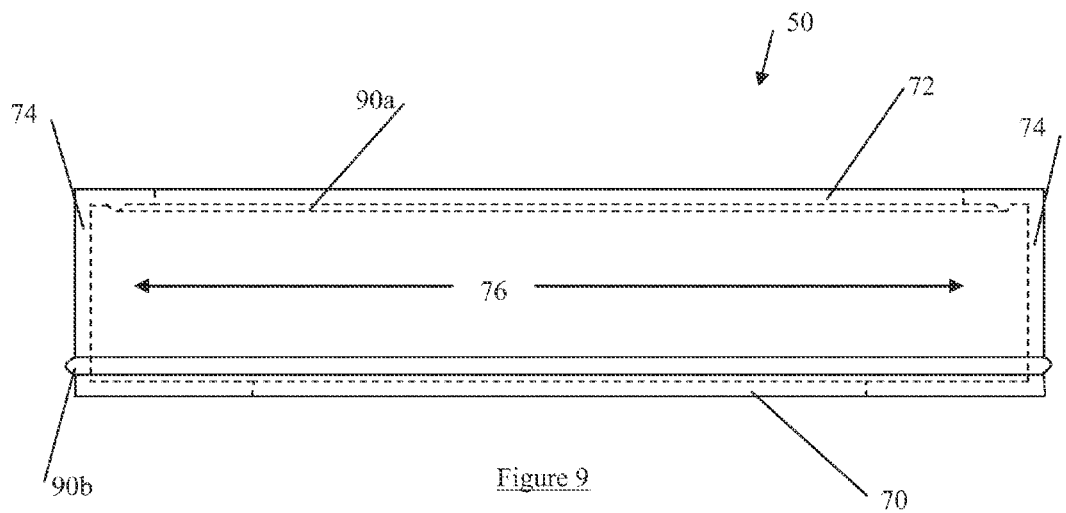
FIG. 9 is a side view of the seal component of FIG. 7 viewed from a side portion of the portable terminal.

Accordingly, described above is the display assembly 60 for the portable terminal 10 for inhibiting the penetration of foreign matter from the exterior environment 18 into the interior of the portable terminal 10. The display assembly 60 includes the display 30 for mounting in the open faced compartment 56 enclosed by the top cover plate 31, the display 30 having the bottom surface 84, the plurality of side surfaces 82, and the top surface 80 for interaction with the user of the portable terminal 10. The compartment 56 of the enclosure 23 of the display assembly 60 has the interior bottom surface 54 and the plurality of interior side surfaces 57. The resilient seal component 50 of the display assembly 60 is positioned between the display 30 and the compartment 56, the seal component 50 including a body 88 (see FIG. 8) including the base portion 70 connected to the top portion 72 by the plurality of side portions 74 for defining the interior channel 76 for engaging the sides 84 of the display 30 once received therein. The top portion 72 is adapted for overlapping a portion of the top surface 80 of the display 30 and the base portion 70 for overlapping at least a portion of the bottom surface 84 of the display 30. The body 88 has the exterior surface 79 for positioning adjacent to the interior surfaces 57,54 of the compartment and the interior surface 77 of the channel 76 for positioning adjacent to the top surface 80 and the bottom surface 82 and the plurality of side surfaces 84 of the display. The seal body 88 has a first sealing rib 90*a,b,c* positioned on either the exterior surface 59 or the interior surface 77 of the seal body 88, the first sealing rib being integral, for example, with the seal body 88 and projecting from the respective exterior 79 or interior surface 77. The first sealing rib 90*a,b,c* when positioned on the interior surface 77 is for inhibiting the penetration of the foreign matter between the display 30 and the first sealing rib 90*a,b,c* and the first sealing rib 90*a,b,c* when positioned on the exterior surface 79 is for inhibiting the penetration of the foreign matter between the compartment 56 and the first sealing rib 90*a,b,c*.

Alternative Seal Component 51 and Display Assembly 61

Figure 17:
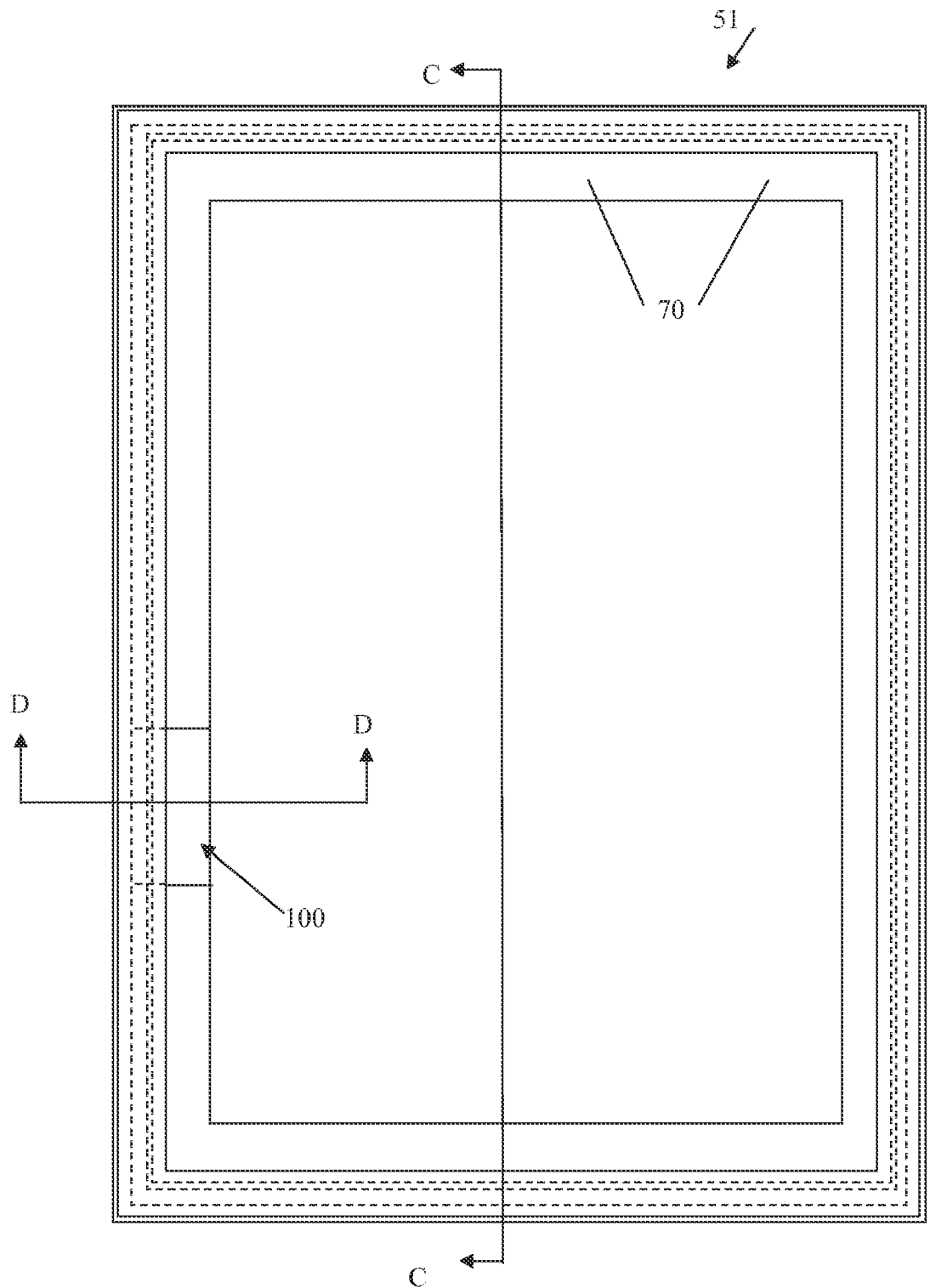
FIG. 17 is a top view of an alternative embodiment of the seal component of FIG. 7.

Referring to FIG. 17, shown is an alternative seal component 51, where similar reference numerals as compared to the seal component 50 (see FIG. 7) denote similar features between the seal components 50,51.

Figure 18:
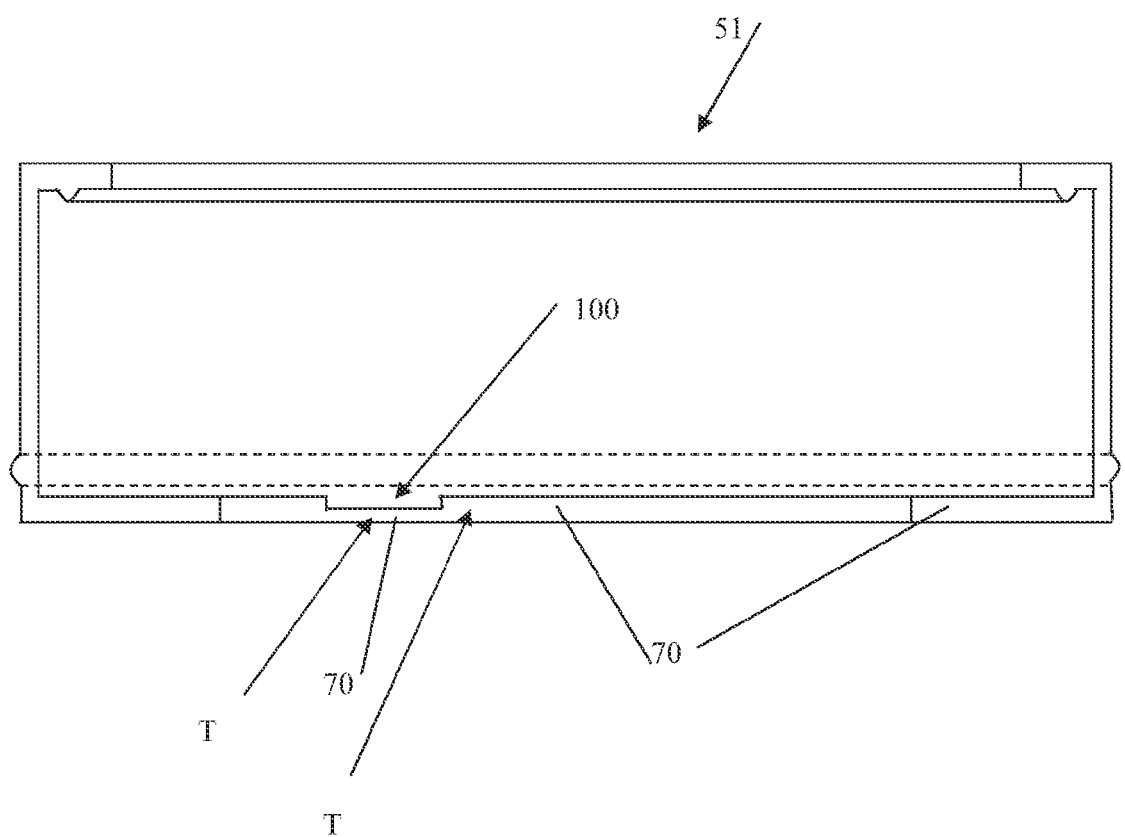
FIG. 18 is a cross-sectional view D-D of the alternative embodiment of the seal component of FIG. 17.
Figure 19:
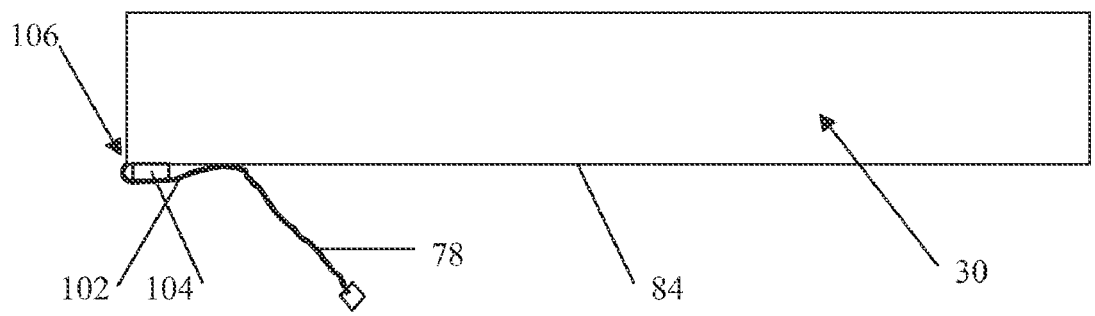
FIG. 19 is an alternative embodiment of the display of FIG. 4.

The seal component 51 has an inset portion 100 located in the interior surface 77 of the base portion 70, such that a thickness T of the base portion of the insert portion 100 is less than the thickness of the surrounding base portion 70 (see FIG. 18). The inset portion 100 is sized so as to accommodate the presence of the connection 78 (see FIG. 19) on the bottom surface 84 of the display 30. Interposed between the bottom surface 84 of the display and an extension portion 102 of the connection 78 (e.g. a flex cable) is a member 104, preferably made of a resilient material (e.g. foam). The member 104 is positioned between the bottom surface 84 of the display and the extension portion 102 of the connector 78, so as to inhibit damage to the integrity of the connector 78 due to folding (e.g. creasing) of the connector 78 at a connection 106 of the connector 78 to the bottom surface 84. Presence of the member 104 in a display assembly 61 (see FIG. 20) can also facilitate the sealing (against the penetration of foreign matter) between the inside surface 77 of the base portion 70 and the bottom surface 84 of the display 30 while inhibiting damage to the integrity of the connector 78.

Figure 20:
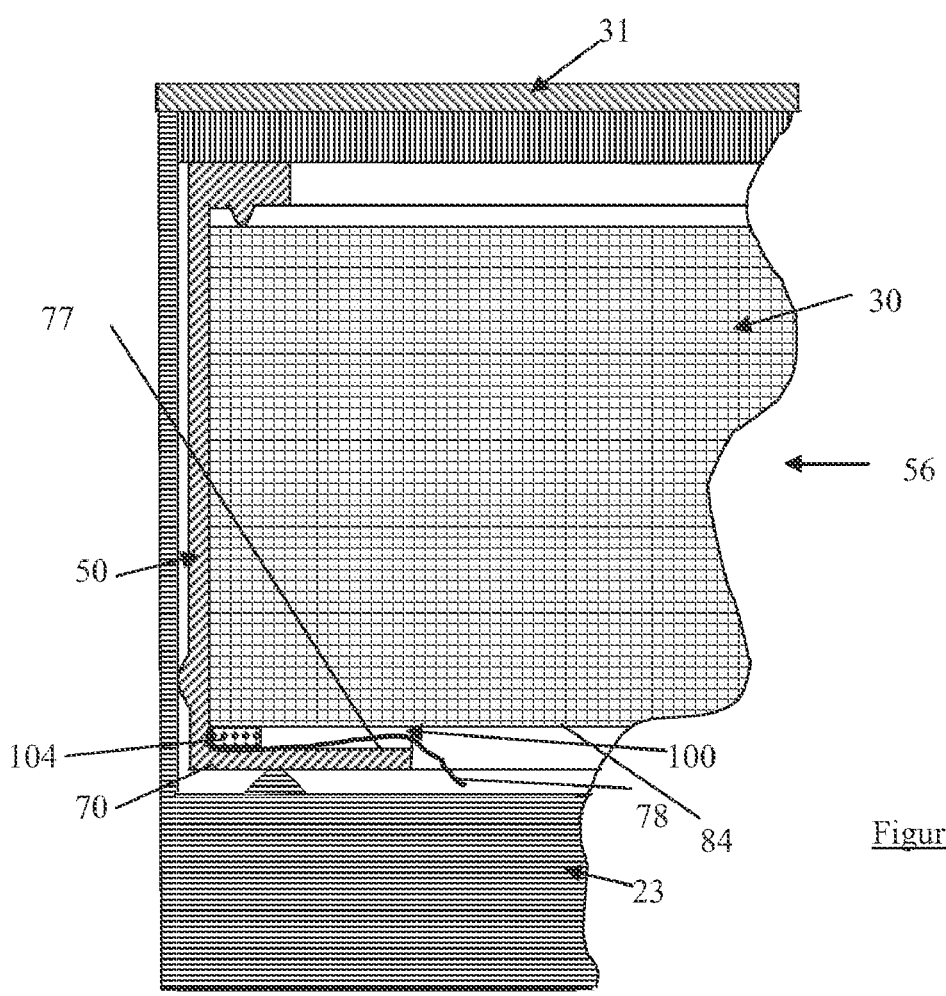
FIG. 20 is a cross-sectional view of the alternative embodiment of the seal component of FIG. 17 showing the features of the assembled display assembly.

Referring to FIG. 20, shown is a cross-sectional view of the display assembly 61, wherein similar reference numerals as compared to the display assembly 60 (see FIG. 15) denote similar features between the display assemblies 60,61. It is noted that the member 104 is compressed between the extended portion 102 (see FIG. 19) of the connector 78 and the bottom surface 84 of the display 30, thereby helping to provide a cushioning effect there-between for inhibiting damage to the integrity of the connector 78 at the connection 106 (see FIG. 19) of the connector 78 with the display 30. It is recognised that the member 104 is positioned along a width of the connector 78 positioned in the inset region 100 of the base portion 70 of the seal component 51. Further, as described above, the seal component 51 can have any of the sealing rib 90a,b,c configurations described for the seal component 50, as desired.

Accordingly, as noted above, the display assembly 61 includes the aperture 75 in the base portion 70 of the seal body 88 adapted for facilitating passage there through of the connector 78 located on the bottom surface 84 of the display 30. The inset portion 100 is located at a selected position on the interior surface 77 of the base portion 70 such that a thickness T of the base of the inset portion 100 is less than the thickness T of the adjacent base portion 70, the inset portion is positioned adjacent to the aperture 75. The width of the inset portion 100 is sized to accommodate a width of the connector 78 coupled to the bottom surface 84 of the display 30. The thickness T of the inset portion 100 is sized to accommodate the overlap 106 of the connector 78 in the vicinity of the inset portion 100. The member 104 is positioned in the overlap 106 of the connector 78, such that the member 104 is made of a resilient material, the member 104 for inhibiting damage to the integrity of the connector 78 in the vicinity of the overlap 106.

Alternative Seal Component 50a and Display Assembly 60a

Figure 21:
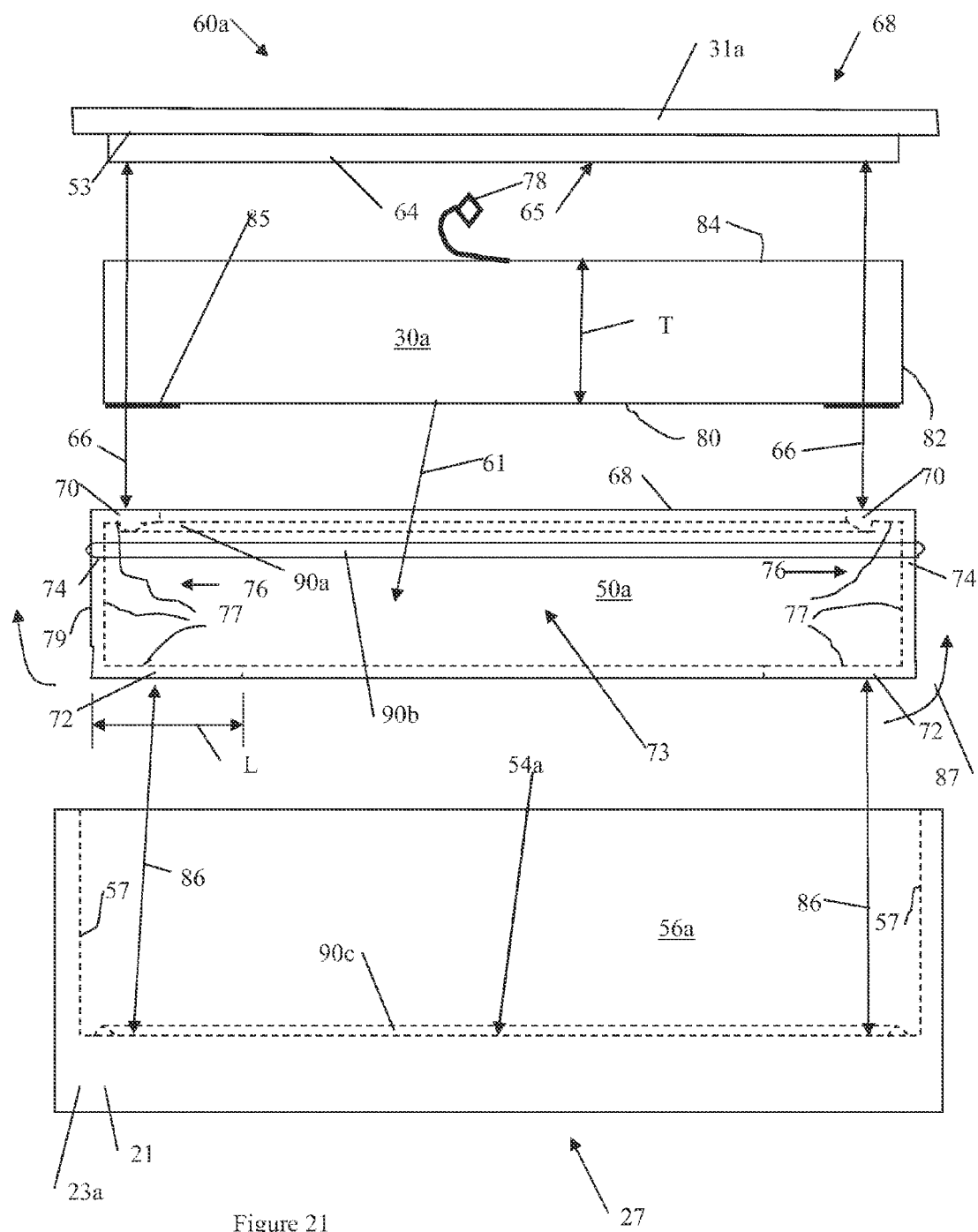
FIG. 21 is an alternative embodiment of the assembly of FIG. 4.

Referring to FIG. 21, a display 30a is coupled to an enclosure 23a by a bottom plate 31a connected (e.g. releasable) via a plurality of fasteners 33 (e.g. screws, snaps, rivets, adhesive or other fastening means as apparent to one skilled in the art). The display 30a is situated between a seal component 50a and a compartment 56a of the enclosure 23a, such that the ingress of foreign matter (e.g. water, moisture, particulate matter, etc.) around the display 30a and into the compartment 56a (e.g. onto a top surface 54a and/or a bottom surface 53 of the compartment 56a) is inhibited by the seal component 50. Further, the display 30a (e.g. configured as a touch screen) has a top surface 80 (e.g. for providing a display of logistical information related to the logistics environment 18—see FIG. 1), a plurality of side surfaces 82, and a bottom surface 84, such that the side surfaces 82 connect the top surface 80 with the bottom surface 84 to define a component volume of the display 30a. It is recognised in this embodiment that the display top surface 80 is oriented towards the top surface 27 of the enclosure 23a and the bottom surface 84 is oriented towards the bottom surface 68 (e.g. composed of the bottom cover 31a) of the enclosure 23a.

The seal component 50a has a base portion 70 connected to a top portion 72 by a plurality of side portions 74, thereby defining a channel 76 into which the display 30a is inserted/received 61. The channel 76 provides the interior peripheral surface 77 (e.g. generally U shaped) of the seal component 50a for positioning against (and/or adjacent to) at least a portion of the top surface 80, the side surfaces 82 and at least a portion of the bottom surface 84 of the display 30a. The top portion 72 and the base portion 70 extend from the side portions 74 and are in a spaced apart relationship with respect to the attachment locations of the portions 70,72 to the side portions 74, in order to accommodate the thickness T of the display 30a inserted/received 61 there between. It is recognised that the base portion 70 can be as shown in FIG. 10a for overlapping a portion of the bottom surface 84 of the display 30 or can be as shown in FIG. 10b for overlapping the entire bottom surface 84. Further, one or more apertures (e.g. holes) 75 can be positioned in the base portion 70 for accommodating the connection/coupling 78 located on the bottom surface 84 (e.g. for power and/or information) between the display 30a and other components 19 (e.g. power source 36, processor 32) of the computer 24 (see FIG. 1). For example, the connector 78 is a flex cable having a length for extending between the display 30a and one or more of the components 19 of the computer 24 and a width for providing one or more independent connections (e.g. display signals, power, etc.) between the one or more of the components 19 and the display 30a.

Referring again to FIG. 21, a plurality of sealing ribs 90 (e.g. sealing ribs 90a, 90b, and/or 90c) are included in a display assembly 60a, further described below, in order to inhibit the ingress of contaminant matter (e.g. water, other fluids, particulate matter, etc.) from the logistics environment 18 (see FIG. 1) into and between the display 30a and the seal component 50a (e.g. coming in contact with the surface 77 of the base portion 70 and/or the side portions 74) and/or into and between the seal component 50a and the compartment 56a (e.g. coming in contact with the inside top surface 54a or bottom surface 53 of the compartment 56a). For example, the sealing rib 90a is located around the peripheral interior surface 77 of the base portion 70 of the seal component 50a. For example, the sealing rib 90b is located around a peripheral exterior surface 79 of the side portions 74 of the seal component 50a. For example, the sealing rib 90c is located around the periphery of the top surface 54a of the compartment 56a. In any event, it is preferable that at least one of the sealing ribs 90a,b,c are integral to the material of the seal component 50a. It is also recognised that the sealing rib 64 and sealing surface 65 can be used to seal between the bottom cover 31a and the bottom surface 53 of the compartment 56a. It is also recognised that the sealing ribs 90a,b,c can be located other than shown, for example as in FIG. 16 where the top cover 31 is the bottom cover 31a, the display 30 is the display 30a, the seal component 50 is the seal component 50a and the compartment 56 is the compartment 56a.

The seal component 50a is made of a resilient material for facilitating a compression of the sealing component between the bottom plate 31a and the top surface 80 of the display 30a, between the side surface 82 of the display 30a and a sidewall 57 of the compartment 56a, and/or between the bottom surface 84 of the display 30 and the top surface 53 of the compartment 56a. The material of the seal component 50a is made of resiliently flexible material, such as but not limited to: rubber; a rubber derivative; an elastomeric material; and other suitable polymers as would be apparent to one skilled in the art, for facilitating the seal for inhibiting the penetration of contaminant material from the logistics environment 18 into the interior of the enclosure 23a of the portable terminal 10.

Further, it is recognised that the extent of the base portion (s) 70 extending inwardly from the side portion(s) 74 is of a length L sufficient to provide an appropriate friction force between the surface 77 of the top portion(s) 72 and the top surface 80 of the display 30a, such that this friction force between the two surfaces inhibits at least a partial release of the display 30a from the channel 76 as the assembled display 30a and seal 50a (as an assembled unit) are inserted 86 into the compartment 56a from the bottom surface 68 towards the top surface 27 of the enclosure 23a. Any appreciable release of the display 30a from the channel 76 (as the assembled display 30a and seal component 50a are being inserted as an assembled unit into the compartment 56a) can cause a misalignment 87 of the sealing rib 90a between the bottom surface 84 of the display 30a and the interior surface 77 of the base portion(s) 70 of the seal component 50a, and/or a misalignment of the top portion(s) 72 of the seal component 50a between the top surface 80 of the display 30a and the top surface 54a of the compartment 56a, thus causing a potential failure of the seal (for inhibiting the penetration of foreign matter) between the display 30a and the seal component 50a and/or between the seal component 50a and the compartment 56a. It is also recognised that the top surface 80 of the display 30a can optionally have a coating 85 (or other intermediate layer applied/adhered thereto) on all or a portion of the top surface 80 (e.g. in the vicinity of the overlap between the top portion 72 and the top surface 80), for enhancing the friction force between the interior surface 77 of the top portion 72 with the display 30a.

Accordingly, described above is the display assembly 60a for the portable terminal 10 for inhibiting the penetration of foreign matter from the exterior environment 18 into the interior of the portable terminal 10. The display assembly 60a includes the display 30a for mounting in the open faced compartment 56a enclosed by the bottom cover plate 31a, the display 30a having the bottom surface 84, the plurality of side surfaces 82, and the top surface 80 for interaction with the user of the portable terminal 10. The compartment 56a of the enclosure 23a of the display assembly 60a has the interior top surface 54a and the plurality of interior side surfaces 57. The resilient seal component 50a of the display assembly 60a is positioned between the display 30a and the compartment 56a, the seal component 50a including the body 88 (see FIG. 8) including the base portion 70 connected to the top portion 72 by the plurality of side portions 74 for defining the interior channel 76 for engaging the sides 84 of the display 30 once received therein. The top portion 72 is adapted for overlapping a portion of the top surface 80 of the display 30 and the base portion 70 for overlapping at least a portion of the bottom surface 84 of the display 30. The body 88 has the exterior surface 79 for positioning adjacent to the interior surfaces 57,54a of the compartment 56a and the interior surface 77 of the channel 76 for positioning adjacent to the top surface 80 and the bottom surface 82 and the plurality of side surfaces 84 of the display.

The seal body 88 has a first sealing rib 90a,b,c positioned on either the exterior surface 59 or the interior surface 77 of the seal body 88, the first sealing rib being integral, for example, with the seal body 88 and projecting from the respective exterior 79 or interior surface 77. The first sealing rib 90a,b,c when positioned on the interior surface 77 is for inhibiting the penetration of the foreign matter between the display 30 and the first sealing rib 90a,b,c and the first sealing rib 90a,b,c when positioned on the exterior surface 79 is for inhibiting the penetration of the foreign matter between the compartment 56a and the first sealing rib 90a,b,c.

Further, referring to FIG. 21, it is recognised that the extent of the top portion(s) 72 extending inwardly from the side portion(s) 74 is of a length L (providing an overlap surface of a corresponding overlap area) sufficient to provide an appropriate friction force between the surface 77 of the top portion (s) 72 and the top surface 80 of the display 30a, such that this friction force between the two surfaces inhibits at least a partial release of the display 30aa from the channel 76 as the assembled display 30 and seal 50a (as an assembled unit) are inserted 86 into the compartment 56a. Accordingly, the overlap area between the top portion 72 and the top surface 80 of the display 30a is of a sufficient size for facilitating the frictional forces between the interior surface 77 of the top portion 72 and the top surface 80 of the display 30a to inhibit at least the partial release of the display 30a from the channel 76 when the assembled display 30a and seal body 88 as a unit are inserted into the compartment 56a. It is recognised that the partial release of the display 30 from the channel 76 may cause a misalignment of the first sealing rib 90a,b,c between the top portion 72 and the top surface 80 of the display 30.

Further, it is recognised that in the display assembly 60a the bottom cover plate 31a when coupled to the enclosure 23a of the portable terminal 10 is adapted to force (e.g. via the rib 64) the base portion 70 onto the bottom surface 84 of the display 30a and to force the top surface 80 of the display 30a onto the top surface 54a of the compartment 56a, thereby providing the sealable engagement of the sealing rib 90a between the base portion 70 and the bottom surface 84 of the display 30a and to providing the sealable engagement of the sealing rib 90c between the top portion 72 and the top surface 54a of the compartment 56a.

We claim:

1. A resilient seal component for inhibiting a penetration of foreign matter from an exterior environment into an interior of a portable terminal, the portable terminal having a display for mounting in an open faced compartment enclosed by a top cover plate, the display having a bottom surface, a plurality of side surfaces, and a top surface for interaction with a user of the portable terminal, the compartment having an interior bottom surface and a plurality of interior side surfaces, the seal component comprising:

a body including a base portion connected to a top portion by a plurality of side portions for defining an interior channel adapted for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and a first sealing rib positioned on either the exterior surface or the interior surface of the seal body, the first sealing rib integral with the seal body and projecting from the respective exterior or interior surface;

wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

2. The resilient seal component of claim 1 further comprising an overlap area between the base portion and the bottom surface of the display of a sufficient size for facilitating a friction force between the interior surface of the base portion and the bottom surface of the display to inhibit at least a partial release of the display from the channel when the assembled display and seal body as a unit are inserted into the compartment.

3. The resilient seal component of claim 2 further comprising an inset portion located at a selected position on the interior surface of the base portion such that a thickness of the base of the inset portion is less than the thickness of the adjacent base portion.

4. The resilient seal component of claim 3 further comprising a width of the inset portion sized to accommodate a width of a connector coupled to the bottom surface of the display.

5. The resilient seal component of claim 4, wherein the thickness of the inset portion is sized to accommodate an overlap of the connector.

6. The resilient seal component of claim 2, wherein the first sealing rib is positioned on the interior surface of the top portion of the seal body.

7. The resilient seal component of claim 2 further comprising a second sealing rib positioned on the exterior surface the seal body, the second sealing rib integral with the seal body and projecting from the respective exterior surface.

8. The resilient seal component of claim 7 further comprising an aperture in the base portion of the seal body adapted for facilitating passage there through of a connector located on the bottom surface of the display.

9. A resilient seal component for inhibiting a penetration of foreign matter from an exterior environment into an interior of a portable terminal, the portable terminal having a display for mounting in an open faced compartment enclosed by a bottom cover plate, the display having a bottom surface, a plurality of side surfaces, and a top surface for interaction with a user of the portable terminal, the compartment having an interior top surface and a plurality of interior side surfaces, the seal component comprising:
a body including a base portion connected to a top portion by a plurality of side portions for defining an interior channel adapted for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and
a first sealing rib positioned on either the exterior surface or the interior surface of the seal body, the first sealing rib integral with the seal body and projecting from the respective exterior or interior surface;
wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

10. The resilient seal component of claim 9 further comprising an overlap area between the top portion and the top surface of the display of a sufficient size for facilitating a friction force between the interior surface of the top portion and the top surface of the display to inhibit at least a partial release of the display from the channel when the assembled display and seal body as a unit are inserted into the compartment.

11. The resilient seal component of claim 9 further comprising an inset portion located at a selected position on the interior surface of the base portion such that a thickness of the base of the inset portion is less than the thickness of the adjacent base portion.

12. The resilient seal component of claim 11 further comprising a width of the inset portion sized to accommodate a width of a connector coupled to the bottom surface of the display.

13. The resilient seal component of claim 12, wherein the thickness of the inset portion is sized to accommodate an overlap of the connector.

14. The resilient seal component of claim 9 further comprising a second sealing rib positioned on the exterior surface the seal body, the second sealing rib integral with the seal body and projecting from the respective exterior surface, such that the first sealing rib is positioned on the interior surface of the seal body.

15. The resilient seal component of claim 14 further comprising an aperture in the base portion of the seal body adapted for facilitating passage there through of a connector located on the bottom surface of the display.

16. A display assembly for a portable terminal for inhibiting a penetration of foreign matter from an exterior environment into an interior of a portable terminal; the display assembly including:
a display for mounting in an open faced compartment enclosed by a top cover plate, the display having a bottom surface, a plurality of side surfaces, and a top surface for interaction with a user of the portable terminal;
the compartment of an enclosure of the portable terminal having an interior bottom surface and a plurality of interior side surfaces;
a resilient seal component for positioning between the display and the compartment, the seal component including a body including a base portion connected to a top portion by a plurality of side portions for defining an interior channel for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and
a first sealing rib positioned on either the exterior surface or the interior surface of the seal body, the first sealing rib integral with the seal body and projecting from the respective exterior or interior surface;
wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

17. The display assembly of claim 16 further comprising an aperture in the base portion of the seal body adapted for facilitating passage there through of a connector located on the bottom surface of the display.

18. The display assembly of claim 17 further comprising an inset portion located at a selected position on the interior surface of the base portion such that a thickness of the base of the inset portion is less than the thickness of the adjacent base portion, the inset portion is positioned adjacent to the aperture.

19. The display assembly of claim 18 further comprising a width of the inset portion sized to accommodate a width of the connector coupled to the bottom surface of the display.

20. The display assembly of claim 19, wherein the thickness of the inset portion is sized to accommodate an overlap of the connector in the vicinity of the inset portion.

21. The display assembly of claim 20 further comprising a member positioned in the overlap of the connector, the member made of a resilient material, the member for inhibiting damage to the integrity of the connector in the vicinity of the overlap.

22. The display assembly of claim 16 further comprising a second sealing rib positioned between the exterior surface the seal body and the interior surface of the compartment, such that the first sealing rib is positioned on the interior surface of the seal body.

23. The display assembly of claim 16, wherein the first sealing rib is positioned on the interior surface of the top portion of the seal body.

24. The display assembly of claim 22 further comprising an overlap area between the base portion and the bottom surface of the display of a sufficient size for facilitating a friction force between the interior surface of the base portion and the bottom surface of the display to inhibit at least a partial release of the display from the channel when the assembled display and seal body as a unit are inserted into the compartment, the partial release to cause a misalignment of the first sealing rib between the top portion and the top surface of the display.

25. The display assembly of claim 22, wherein the second sealing rib is located on the exterior surface of the base portion of the seal body for contacting the bottom interior surface of the compartment.

26. The display assembly of claim 25, wherein the second sealing rib is integral with the material of the compartment and projecting from the interior bottom surface of the compartment.

27. The display assembly of claim 25, wherein the top cover plate when coupled to the enclosure of the portable terminal is adapted to force the top portion onto the top surface of the display and to force the bottom surface of the display onto the bottom surface of the compartment, the forcing to sealably engage the first sealing rib between the top portion and the top surface of the display and to sealably engage the second sealing rib between the base portion and the bottom surface of the compartment.

28. The display assembly of claim 27 further comprising a third sealing rib positioned on the exterior surface the seal body, the third sealing rib integral with the seal body and projecting from the respective exterior surface on the sides of the seal body, the third sealing rib adapted to sealably engage with the interior sides of the compartment.

29. A display assembly for a portable terminal for inhibiting a penetration of foreign matter from an exterior environment into an interior of a portable terminal; the display assembly including:
- a display for mounting in an open faced compartment enclosed by a bottom cover plate, the display having a bottom surface, a plurality of side surfaces, and a top surface for interaction with a user of the portable terminal;
- the compartment of an enclosure of the portable terminal having an interior top surface and a plurality of interior side surfaces;
- a resilient seal component for positioning between the display and the compartment, the seal component including a body including a base portion connected to a top portion by a plurality of side portions for defining an interior channel for engaging the sides of the display once received therein, the top portion adapted for overlapping a portion of the top surface of the display and the base portion for overlapping at least a portion of the bottom surface of the display, the body having an exterior surface for positioning adjacent to the interior surfaces of the compartment and an interior surface of the channel for positioning adjacent to the top surface and the bottom surface and the plurality of side surfaces of the display; and
- a first sealing rib positioned on either the exterior surface or the interior surface of the seal body, the first sealing rib integral with the seal body and projecting from the respective exterior or interior surface;
- wherein the first sealing rib when positioned on the interior surface is for inhibiting the penetration of the foreign matter between the display and the first sealing rib and the first sealing rib when positioned on the exterior surface is for inhibiting the penetration of the foreign matter between the compartment and the first sealing rib.

* * * * *

UNITED STATES PATENT AND TRADEMARK OFFICE
CERTIFICATE OF CORRECTION

PATENT NO. : 8,071,878 B2
APPLICATION NO. : 12/181854
DATED : December 6, 2011
INVENTOR(S) : Mangaroo et al.

It is certified that error appears in the above-identified patent and that said Letters Patent is hereby corrected as shown below:

In the Specifications:

In Column 4, Line 18, delete "a top" and insert -- is a top --, therefor.

In Column 4, Line 28, delete "is bottom" and insert -- is a bottom --, therefor.

In Column 6, Line 42, delete "least on" and insert -- least one --, therefor.

In Column 14, Line 4, delete "30aa" and insert -- 30a --, therefor.

Signed and Sealed this
Twenty-third Day of April, 2013

Teresa Stanek Rea
*Acting Director of the United States Patent and Trademark Office*